(12) United States Patent
Nakamura

(10) Patent No.: US 7,970,137 B2
(45) Date of Patent: Jun. 28, 2011

(54) CONTENT REPRODUCTION APPARATUS, CONTENT RECORDING APPARATUS, NETWORK SYSTEM, AND CONTENT RECORDING/REPRODUCTION METHOD

(75) Inventor: Shigeki Nakamura, Tokyo (JP)

(73) Assignee: Sony Corporation, Tokyo (JP)

(*) Notice: Subject to any disclaimer, the term of this patent is extended or adjusted under 35 U.S.C. 154(b) by 1892 days.

(21) Appl. No.: 11/065,198

(22) Filed: Feb. 23, 2005

(65) Prior Publication Data

US 2005/0196145 A1 Sep. 8, 2005

(30) Foreign Application Priority Data

Mar. 4, 2004 (JP) .............................. P-2004-060012

(51) Int. Cl.
*H04L 9/18* (2006.01)
*H04L 15/30* (2006.01)

(52) U.S. Cl. ............ 380/200; 380/22; 380/42; 713/193; 726/26; 726/27; 726/29; 726/30

(58) Field of Classification Search .................. None
See application file for complete search history.

(56) References Cited

U.S. PATENT DOCUMENTS

| 5,502,766 | A | * | 3/1996 | Boebert et al. ................. 713/193 |
| 5,592,549 | A | * | 1/1997 | Nagel et al. ....................... 705/52 |
| 6,981,152 | B2 | * | 12/2005 | Du et al. ........................... 713/193 |
| 7,120,251 | B1 | * | 10/2006 | Kawada et al. ................. 380/201 |
| 2003/0014630 | A1 | * | 1/2003 | Spencer et al. ................ 713/168 |
| 2003/0158958 | A1 | | 8/2003 | Chiu |
| 2004/0133794 | A1 | * | 7/2004 | Kocher et al. ................. 713/193 |

FOREIGN PATENT DOCUMENTS

| JP | 07-231439 | 8/1995 |
| JP | 2000-165842 | 6/2000 |
| JP | 2001-024973 | 1/2001 |
| JP | 2002-077862 | 3/2002 |
| JP | 2002112220 | 4/2002 |
| JP | 2002-171503 | 6/2002 |

(Continued)

OTHER PUBLICATIONS

Andrew Tokmakoff et al., "Home Media Server content management," Proceedings of SPIE, vol. 4519, pp. 168-179, XP009017768, 2001.

(Continued)

*Primary Examiner* — Minh Dinh
*Assistant Examiner* — Venkat Perungavoor
(74) *Attorney, Agent, or Firm* — K&L Gates LLP

(57) ABSTRACT

Content reproduction apparatus, content recording apparatus, network system, and method of recording and reproducing content are provide. The content reproduction apparatus includes an original content reception section for receiving streams of original content; an encrypted content transmission section for encrypting the streams of original content received by the original content reception section for transmission so as to be recorded on an external content recording apparatus through a network; an information transmission section for transmitting information about the transmitted content including identifying information of a self apparatus so as to be recorded on a recording medium of the content recording apparatus in association with the encrypted streams of content; a content requesting section for requesting the content recording apparatus to acquire the encrypted streams of content recorded in association with the identifying information of the self apparatus; and a content reproduction section for receiving the encrypted streams of content transmitted from the content recording apparatus in accordance with the request, and decrypting the encryption for reproduction.

9 Claims, 17 Drawing Sheets

FOREIGN PATENT DOCUMENTS

| | | |
|---|---|---|
| JP | 2003-203133 | 7/2003 |
| JP | 2004-063032 | 2/2004 |
| WO | 03-081499 | 2/2003 |
| WO | 03/032620 | 4/2003 |
| WO | 03/067594 | 8/2003 |
| WO | 03/071800 | 8/2003 |

OTHER PUBLICATIONS

Share it deliverable #3: Description of example applications, XP-002292778, [online] [printed on May 16, 2004]. Retrieved from the Internet: <URL: http://www.extra.research.philips.com/euprojects/share_it/delverables/share-it-nob31nov02-d3v10-final.pdf>.

Japanese Office Action for corresponding JP2004-060012 issued Jan. 26, 2010.

Japanese Office Action issued on Jun. 29, 2010 for corresponding Japanese patent application 2004-060012.

* cited by examiner

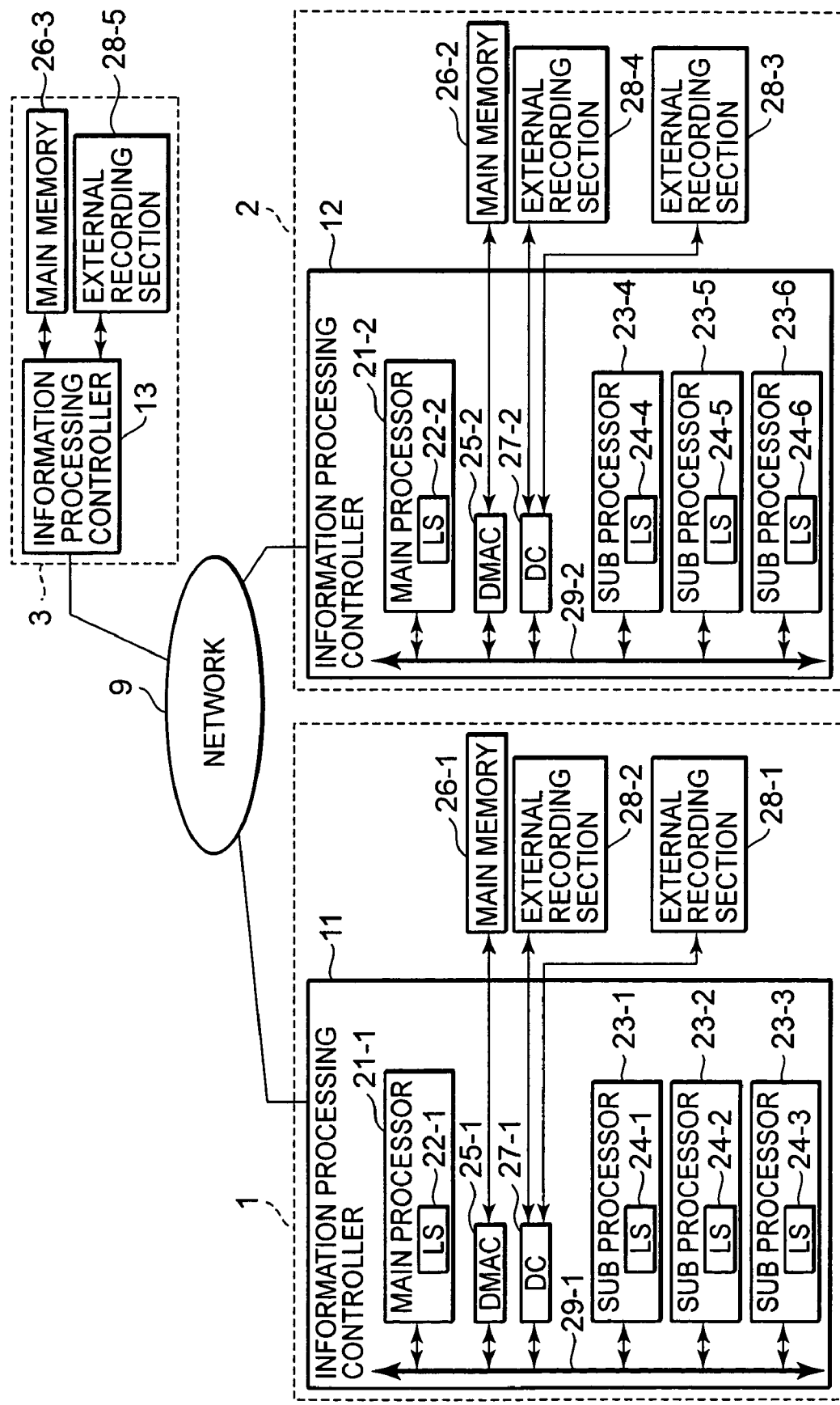

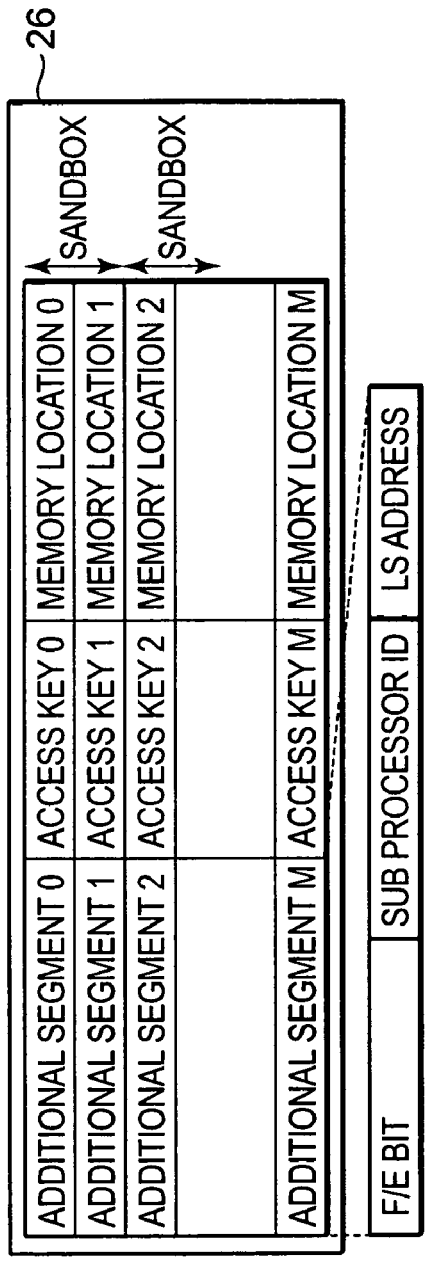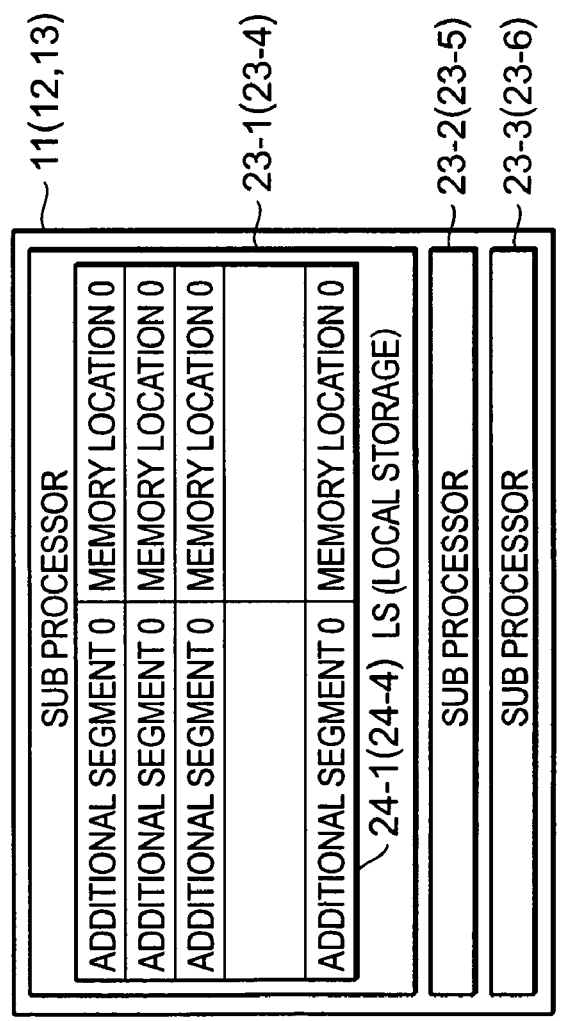

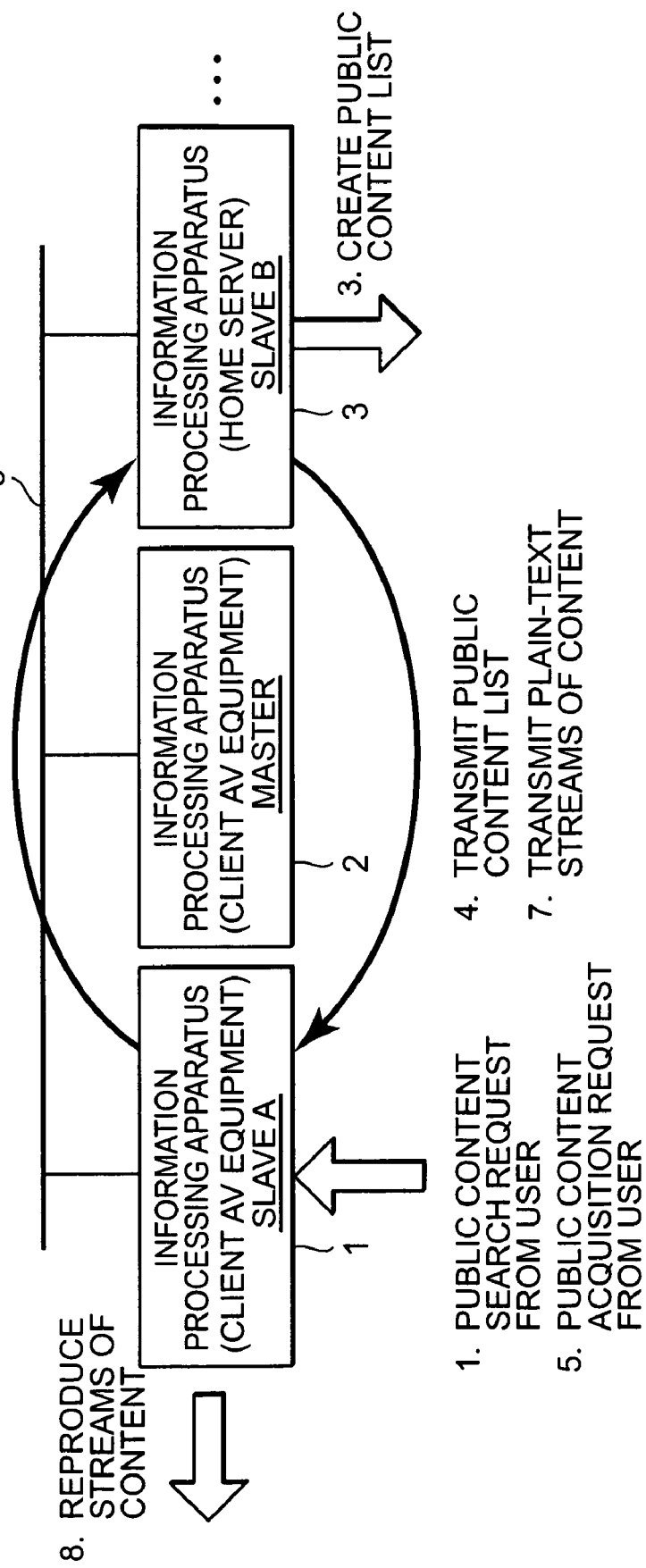

CONTENT REPRODUCTION APPARATUS, CONTENT RECORDING APPARATUS, NETWORK SYSTEM, AND CONTENT RECORDING/REPRODUCTION METHOD

CROSS REFERENCES TO RELATED APPLICATIONS

The present invention claims priority to Japanese Patent Application JP 2004-060012 filed on Mar. 4, 2004, the entire contents of which being incorporated herein by reference.

BACKGROUND OF THE INVENTION

The present invention relates to a content reproduction apparatus, a content recording apparatus, a network system, and a content recording/reproduction method, each of which is responsible to a network.

In recent years, implementation of network-responsible AV (Audio Visual) equipment such as a DTV (Digital Television) and a HDD/DVD-incorporating recorder is in progress. Majority of these network-responsible AV equipment can handle program reservation, remote control, and the like from PCs (Personal Computers) via a network.

Further, in a network-responsible recorder having a built-in MPEG2 encoder, content recorded thereon is encoded into MPEG2 streams at a compression rate suitable for transfer through a network, and then transferred to a PC, AV equipment having a content reproduction function, or the like which is connected to the recorder through the network, so that the content can be reproduced. See, Japanese Laid-Open Patent No. 2002-112220.

However, a series of functions ranging from the external input and broadcast reception to the recording of streams of content is generally carried out by a recorder. Therefore, if the number of programs for simultaneous recording is to be increased or if a new broadcasting format should be handled, a recorder must be newly added. Further, where the total recording capacity of a plurality of recorders is to be increased, storages such as hard disk drives within the individual recorders must be replaced with ones with a larger capacity.

Furthermore, generally, no limitation by, e.g., the proprietary right could be imposed on reproduction of respective content recorded on a recorder. Therefore, where the recorder is shared among a plurality of PCs or AV equipment having a content reproduction function on a network as their content recording section, there has been a security problem that the recorded content could inadvertently be viewed/reproduced by any of the equipment.

SUMMARY OF THE INVENTION

The present invention provides in an embodiment a content reproduction apparatus, a content recording apparatus, a network system, and a content recording/reproduction method which can give a system a high degree of freedom in additional installation, replacement, or the like, and which can impose limitation on reproduction of individual recorded content.

An embodiment of a content reproduction apparatus of this invention has an original content reception section for receiving streams of original content, an encrypted content transmission section for encrypting the streams of original content received by the original content reception section for transmission so as to be recorded on an external content recording apparatus through a network, an information transmission section for transmitting information about the transmitted content including at least identifying information of a self apparatus so as to be recorded on a recording medium of the content recording apparatus in a manner associated with the encrypted streams of content to the content recording apparatus through the network, a content requesting section for requesting the content recording apparatus to acquire the encrypted streams of content recorded on the recording medium in the manner associated with the identifying information of the self apparatus through the network, and a content reproduction section for receiving the encrypted streams of content transmitted from the content recording apparatus through the network in accordance with the request, and decrypting the encryption for reproduction.

Further, one embodiment of a content recording apparatus of this invention has an encrypted content reception section for receiving streams of content encrypted by an external content reproduction apparatus through a network, an information reception section for receiving, from the content reproduction apparatus, information about the received content including at least identifying information of this content reproduction apparatus, a recording section for recording at least the encrypted streams of content received from the encrypted content reception section and the information about the content received from the information reception section on a recording medium in a manner associated with each other, and a content response section for returning the encrypted streams of content recorded on the recording medium in the manner associated with the identifying information of this content reproduction apparatus, to the content reproduction apparatus in accordance with the request from the content reproduction apparatus.

According to the embodiment of the invention described above, in a system of recording/reproducing streams of content, an apparatus for receiving and reproducing the streams of content is separated from an apparatus for recording the streams of content, whereby a degree of freedom in, e.g., additional installation in or modification to respective apparatus is enhanced.

Further, the content recorded on the content recording apparatus is managed in a manner associated with the identifying information of the self apparatus, and thus it is configured such that each of the content reproduction apparatus may not acquire any content other than the content transmitted to the content recording apparatus. As a result, the security problem that recorded content could inadvertently be viewed/reproduced by any of the apparatus can be eliminated.

Furthermore, the streams of content for recording on the content recording apparatus are encrypted with a secret key or the like by the content reproduction apparatus which is a sender, and thus even if the streams of content recorded on the content recording apparatus are taken out thereof, it is difficult to reproduce them.

Furthermore, the embodiment of the content reproduction apparatus of the present invention may have a public content transmission section for decrypting the encrypted streams of content received form the content recording apparatus through the network, for transmission to the content recording apparatus through the network such that this is recorded on the recording medium as public content.

On the other hand, the embodiment of the content recording apparatus of the present invention may have an updating section for updating the encrypted streams of content recorded on the recording medium with the streams of public content received from the content reproduction apparatus through the network.

According to one embodiment of this invention, the streams of content whose encryption is decrypted can be recorded on the content recording apparatus as public content, and thus it can be configured such that the content on the home server is reproduced by different AV equipment.

More specifically, one embodiment of the content recording apparatus of the present invention may have an attribute management section for managing a "public/non-public" attribute of the content recorded on the recording medium, and assigning the "public" attribute to the content updated to the streams of public content by the updating section, and a public content response section for returning the streams of public content assigned the "public" attribute in accordance with a request for public content from the content reproduction apparatus.

As a result, when the content reproduction apparatus makes a request for acquisition of public content, reproduction of the public content by the content reproduction apparatus becomes possible.

A network system based on another embodiment of the present invention is a network system having a content reproduction apparatus and a content recording apparatus connected through a network, which is configured in that: the content reproduction apparatus has an original content reception section for receiving streams of original content, an encrypted content transmission section for encrypting the streams of original content received by the original content reception section for transmission so as to be recorded on the content recording apparatus through the network, an information transmission section for transmitting information about the transmitted content including at least identifying information of a self apparatus so as to be recorded on a recording medium of the content recording apparatus in a manner associated with the encrypted streams of content, through the network, a content requesting section for requesting the content recording apparatus to acquire the encrypted streams of content recorded on the recording medium in the manner associated with the identifying information of the self apparatus, through the network, and a content reproduction section for receiving the encrypted streams of content transmitted from the content recording apparatus through the network according to the request, and decrypting encryption for reproduction; and the content recording apparatus has an encrypted content reception section for receiving the streams of content encrypted by the content reproduction apparatus through the network, an information reception section for receiving, from the content reproduction apparatus, information about the received content including at least identifying information of this content reproduction apparatus, a recording section for recording at least the encrypted streams of content received from the encrypted content reception section and the information about the content received from the information reception section on the recording medium in a manner associated with each other, and a content response section for returning the encrypted streams of content recorded on the recording medium in the manner associated with the identifying information of this content reproduction apparatus, to the content reproduction apparatus in accordance with the request from the content reproduction apparatus.

According to one embodiment of the network system of this invention, an apparatus for receiving and reproducing the streams of content is separated from an apparatus for recording the streams of content, whereby a degree of freedom in, e.g., additional installation in or modification to respective apparatus is enhanced.

Further, the content recorded on the content recording apparatus is managed in a manner associated with the identifying information of the self apparatus, and thus it is configured such that each of the content reproduction apparatus may not acquire any content other than the content it transmitted to the content recording apparatus. As a result, the security problem that recorded content could inadvertently be viewed/reproduced by any of the apparatus can be eliminated.

Furthermore, the streams of content for recording on the content recording apparatus are encrypted with a secret key or the like by the content reproduction apparatus which is a sender, and thus even if the streams of content recorded on the content recording apparatus are taken out thereof, at least its being reproduced will not result.

Furthermore, in one embodiment of the network system of this invention, the content reproduction apparatus may have a public content transmission section for decrypting the encrypted streams of content received form the content recording apparatus through the network, for transmission to the content recording apparatus through the network such that this is recorded on the recording medium as public content, and the content recording apparatus may have an updating section for updating the encrypted streams of content recorded on the recording medium with the streams of public content received from the content reproduction apparatus through the network.

According to one embodiment of this invention, the streams of content whose encryption is decrypted can be recorded on the content recording apparatus as public content, and thus it can be configured such that the content on the home server is reproduced by different AV equipment.

A content recording/reproduction method based on still another embodiment of the present invention is configured in that a content reproduction apparatus and a content recording apparatus are connected through a network, and the content reproduction apparatus receives streams of original content, encrypts these received streams of original content for transmission to the content recording apparatus through the network, and also transmits information about the transmitted content including at least identifying information of a self apparatus to the content recording apparatus through the network; the content recording apparatus records the encrypted streams of content and the information about the content received from the content reproduction apparatus, on a recording medium in a manner associated with each other; and the content reproduction apparatus requests the content recording apparatus to acquire the encrypted streams of content recorded on the recording medium in the manner associated with the identifying information of the self apparatus, through the network, receives the encrypted streams of content transmitted from the content recording apparatus through the network in accordance with this request, and decrypts encryption for reproduction.

According to the embodiment of the content recording/reproduction method of this invention, an apparatus for receiving and reproducing the streams of content is separated from an apparatus for recording the streams of content, whereby a degree of freedom in, e.g., additional installation in or modification to respective apparatus is enhanced.

Further, the content recorded on the content recording apparatus is managed in a manner associated with the identifying information of the self apparatus, and thus it is configured such that each of the content reproduction apparatus may not acquire any content other than the content it transmitted to the content recording apparatus. As a result, the security problem that recorded content could inadvertently be viewed/reproduced by any of the apparatus can be eliminated.

Furthermore, the streams of content for recording on the content recording apparatus are encrypted with a secret key or the like by the content reproduction apparatus which is a sender, and thus even if the streams of content recorded on the content recording apparatus are taken out thereof, at least its being reproduced will not result.

Furthermore, in the embodiment of the content recording/reproduction method of the present invention, the content reproduction apparatus may have a public content transmission section for decrypting the encrypted streams of content received form the content recording apparatus through the network, for transmission to the content recording apparatus through the network such that this is recorded on the recording medium as public content, and the content recording apparatus may have an updating section for updating the encrypted streams of content recorded on the recording medium with the streams of public content received from the content reproduction apparatus through the network.

According to the embodiment of this invention, the streams of content whose encryption is decrypted can be recorded on the content recording apparatus as public content, and thus it can be configured such that the content on the home server is reproduced by different AV equipment.

According to the content reproduction apparatus, the content recording apparatus, the network system, and the content recording/reproduction method of the present invention, a degree of freedom in, e.g., additional installation or replacement with respect to the system is enhanced, and also limitation on reproduction can be imposed on individual recorded content.

Additional features and advantages of the present invention are described in, and will be apparent from, the following Detailed Description of the Invention and the figures.

BRIEF DESCRIPTION OF THE FIGURES

FIG. 1 is a diagram showing an example of a network system of this invention;

FIGS. 2A to 2C are diagrams for explaining an information processing controller included in an example of an information processing apparatus of this invention;

FIG. 17 is a diagram showing operation of reproducing public content.

DETAILED DESCRIPTION OF THE INVENTION

Figure 3:
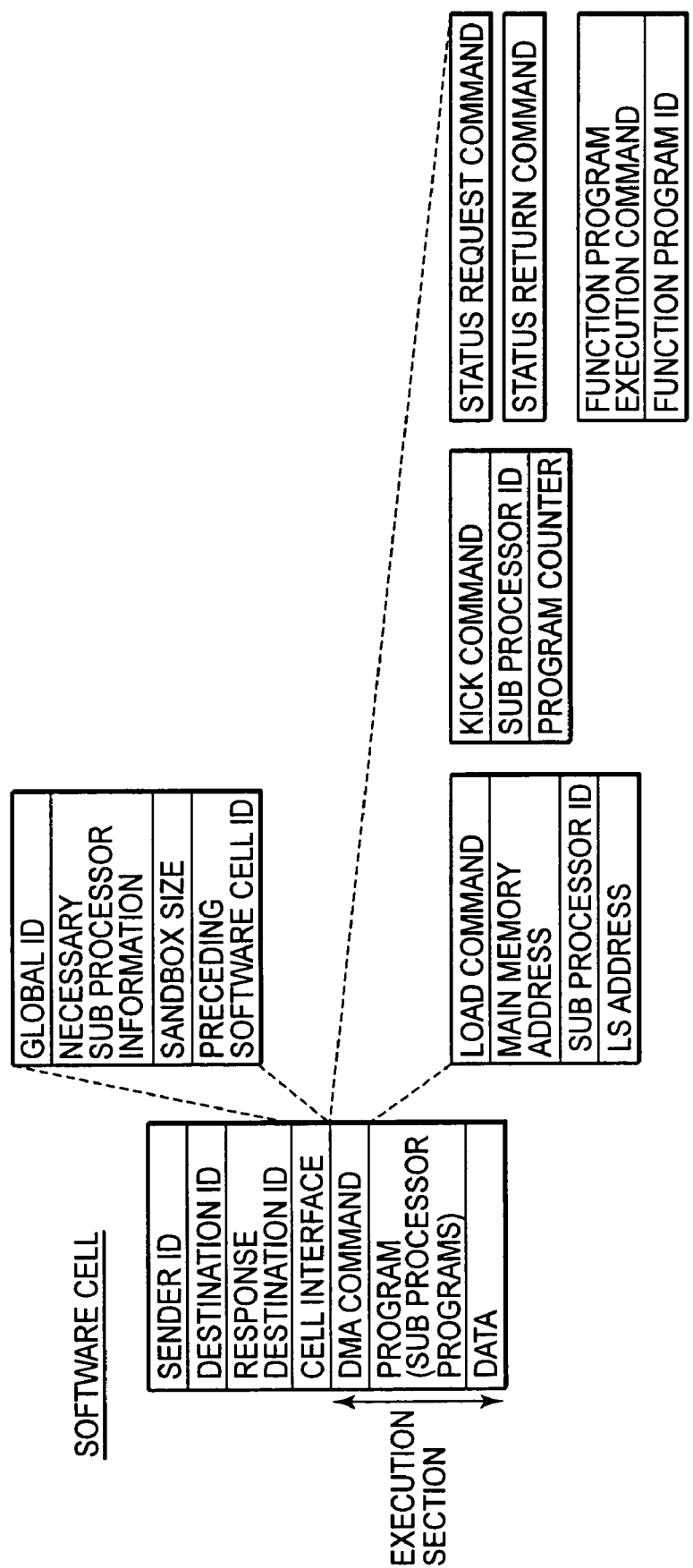
FIG. 3 is a diagram showing an example of a software cell.

The present invention relates to a content reproduction apparatus, a content recording apparatus, a network system, and a content recording/reproduction method, each of which is responsible to a network.

FIG. 1 shows an example of a network system of the present invention, in which a plurality of information processing apparatuses 1, 2, 3 are connected via a network 9.

(Information Processing Apparatus and Information Processing Controller)

Referring to the information processing apparatus 1, the information processing apparatus 1 includes an information processing controller 11 as a computer function section. The information processing controller 11 has a main processor 21-1, sub processors 23-1, 23-2, 23-3, a DMAC (Direct Memory Access Controller) 25-1, and a DC (Disk Controller) 27-1.

The main processor 21-1 performs schedule management of program execution (data processing) by the sub processors 23-1, 23-2, 23-3, and general management of the information processing controller 11 (information processing apparatus 1). However, the main processor 21-1 may be configured otherwise such that a program other than the program for performing the management operates in the main processor 21-1. In this case, the main processor 21-1 functions also as a sub processor. The main processor 21-1 has an LS (Local Storage) 22-1.

Although there may be a single sub processor, preferably there may be a plurality of sub processors. In this example, there are a plurality of sub processors.

The sub processors 23-1, 23-2, 23-3 execute programs in parallel and independently of each other to process data under the control of the main processor 21-1. Further, according to circumstances, it may be configured such that a program in the main processor 21-1 can operate in cooperation with a program in any of the sub processors 23-1, 23-2, 23-3. Also a function program hereinafter described is a program operating in the main processor 21-1. Also the sub processors 23-1, 23-2, 23-3 have LSs (Local Storages) 24-1, 24-2, 24-3, respectively.

The DMAC 25-1 accesses programs and data stored in a main memory 26-1 connected to the information processing controller 11 and formed from a DRAM (Dynamic RAM) or the like, and the DC 27-1 accesses external recording sections 28-1, 28-2 connected to the information processing controller 11.

The external recording sections 28-1, 28-2 may have a form of any of a fixed disk (hard disk) and a removable disk. Further, usable as the removable disk includes various types as a MO, an optical disk such as a CD±RW or a DVD±RW, a memory disk, an SRAM (Static RAM), and a ROM. Therefore, the DC 27-1 is an external recording section controller although it is called the disk controller.

The information processing controller 11 can be configured such that a plurality of external recording sections 28 are connected thereto as shown in FIG. 1.

The main processor 21-1, respective sub processors 23-1, 23-22, 3-3, DMAC 25-1, and DC 27-1 are interconnected by a bus 29-1.

An identifier is allocated as an information processing apparatus ID to the information processing controller 11. The identifier allows the information processing apparatus 1 including the information processing controller 11 to be uniquely identified throughout the entire network.

Also to each of the main processor 21-1 and the respective sub processors 23-1, 23-2, 23-3, an identifier with which it can be identified is similarly allocated as a main processor ID and a sub processor ID, respectively.

It is desirable that the information processing controller 11 be configured as one-chip IC (Integrated Circuit).

Also the other information processing apparatus 2, 3 are configured in a similar manner. Here, those units having the same parent number in their reference characters operate similarly unless otherwise specified even if they have different branch numbers. Further, also in the following description, units with their branch numbers omitted do not mean to cause difference due to their branch numbers being different.

(Accessing from Each Sub Processor to the Main Memory)

As described above, although each of the sub processors 23 in one information processing controller executes a program independently to process data, where different sub processors perform reading out or writing at a time from or into the same areas in the main memories 26, mismatching of data may possibly occur. Therefore, accessing from the sub processors 23 to the main memory 26 is performed in accordance with a procedure such as described below.

As shown in FIG. 2A, the main memory 26 is formed from memory locations with which a plurality of addresses can be designated. An additional segment for storing information indicative of a state of data is allocated to each memory location. The additional segment includes an F/E bit, a sub processor ID, and an LS address (Local Storage address). Further, an access key hereinafter described is allocated to each memory location. The F/E bit is defined as follows.

The F/E bit=0 indicates that data in the corresponding memory location is data being read out and thus processed by a sub processor 23, or invalid data that is not the latest data since the location is in a blank state and is thus disabled from being read out. Further, the F/E bit=0 indicates that data can be written into the corresponding memory location, and the F/E bit is set to 1 after the data is written into the memory location.

The F/E bit=1 indicates that data in the corresponding memory location is not being read out by any sub processor 23 and is thus the latest data not processed as yet. The data in the memory location can be read out, and after the sub processor 23 has read out the data, the F/E bit is set to 0. Further, the F/E bit=1 indicates that the memory location is disabled from writing of data.

Further, in the state of the F/E bit=0 (readout disabled/writing enabled), it is possible to set a readout reservation as to the memory location. When a readout reservation is to be made for a memory location where the F/E bit=0, a sub processor 23 writes the sub processor ID and the LS address of the sub processor 23 as readout reservation information into the additional segment of the memory location to be reserved for readout.

Thereafter, a sub processor 23 on the data writing side writes the data into the memory location reserved for readout, and when the F/E bit is set to 1 (readout enabled/writing disabled), the data is read out to the sub processor ID and the LS address written as the readout reservation information in the additional segment in advance.

Where it is necessary to process data at multiple stages using a plurality of sub processors, when readout/writing of data of each memory location is controlled as described above, immediately after data processed by a processor 23 performing a process at a preceding stage is written into a predetermined address on the main memory 26, another sub processor 23 performing a process at a succeeding stage can read out the pre-processed data.

As shown in FIG. 2B, also the LS 24 in each sub processor 23 is formed from memory locations with which a plurality of addresses can be designated. An additional segment is allocated similarly to each of the memory locations. The additional segment includes a busy bit.

When a sub processor 23 is to read out data in the main memory 26 into a memory location of its LS 24, it sets the corresponding busy bit to 1 to make a reservation. Other data may not be stored into any memory location where the busy bit is 1. Once data has been read out from the memory location of the LS 24, the busy bit is changed to 0 so that the memory location can be used for an arbitrary object thereafter.

As shown in FIG. 2A, the main memory 26 connected to each information processing controller further includes a plurality of sandboxes. The sandboxes define areas within the main memory 26, and each sandbox is allocated to each sub processor 23 and can be used exclusively by the corresponding sub processor. That is, each of the sub processors 23 can use a sandbox allocated thereto but may not access data beyond this area.

The main memory 26 is formed from a plurality of memory locations, and a sandbox is a set of these memory locations.

Further, in order to implement exclusive control of the main memory 26, such a key management table as shown in FIG. 2C is used. The key management table is stored in a comparatively high speed memory such as an SRAM in the information processing controller, and is associated with the DMAC 25. Each record in the key management table includes a sub processor ID, a sub processor key, and a key mask.

A process to be performed when a sub processor 23 uses the main memory 26 is as follows. First, the sub processor 23 outputs a readout or writing command to the DMAC 25. This command includes its sub processor ID and an address of the main memory 26, which is a destination of a request for use.

Before the DMAC 25 executes this command, it refers to the key management table to search the sub processor key of the sub processor, which is a source of the request for use. Next, the DMAC 25 compares the searched sub processor key of the source of the request for use with an access key allocated to the memory location shown in FIG. 2A in the main memory 26, which is the destination of the request for use, and executes the above-mentioned command only when the two keys coincide with each other.

A key mask on the key management table shown in FIG. 2C can set, when an arbitrary bit thereof is set to 1, a corresponding bit of the sub processor key associated with the key mask to 0 or 1.

It is assumed that, e.g., the sub processor key is 1010. Usually, with this sub processor key, only access to a sandbox having an access key of 1010 is enabled. However, where the key mask associated with this sub processor key is set to 0001, only a digit in which the bit of the key mask is set to 1 is masked in determining coincidence between the sub processor key and the access key. Consequently, with this sub processor key 1010, access to a sandbox having an access key of 1010 or 1011 is enabled.

The exclusive property of the sandboxes of the main memory 26 is implemented as described above. That is, where data needs to be processed at multiple stages by a plurality of sub processors in one information processing controller, only a sub processor performing a process at a preceding stage and another sub processor performing a process at a succeeding stage are permitted to access a predetermined address of the main memory 26, and consequently, the data can be protected.

For example, it is considered to be used in the following manner. First, immediately after an information processing apparatus is started, the values of the key masks are all zeros. It is assumed that a program in the main processor is executed to operate in cooperation with programs in the sub processors. When it is intended to store processing result data outputted from a first sub processor once into the main memory and then input the processing result data to a second sub processor, the corresponding main memory area must be accessible from both sub processors. In such a case, the program in the main processor changes the values of the key masks suitably to provide a main memory area that is accessible from the plurality of sub processors, to enable multi-stage processing by the sub-processors.

More specifically, when multi-stage processing is to be performed under a procedure of data from a different information processing apparatus→processing by the first sub processor→first main memory area→processing by the second sub processor→second main memory area, the second sub processor may not access the first main memory area if the following settings are maintained:

Sub processor key of the first sub processor, 0100;
Access key of the first main memory area, 0100;
Sub processor key of the second sub processor, 0101;
Access key of the second main memory area, 0101.

Therefore, by setting the key mask of the second sub processor to 0001, the second sub processor is permitted to access the first main memory area.

(Production and Configuration of a Software Cell)

In the network system of FIG. 1, a software cell is transmitted between the information processing apparatus 1, 2, 3 so that distributed processing may be performed by the information processing apparatuses 1, 2, 3. That is, the main processor 21 included in the information processing controller in a certain information processing apparatus produces a software cell that includes a command, a program, and data, for transmission to another information processing apparatus through the network 9, whereby it can distribute processing.

FIG. 3 shows an example of a configuration of the software cell. The software cell in this example includes a sender ID, a destination ID, a response destination ID, a cell interface, a DMA command, a program, and data as a whole.

The sender ID includes a network address of an information processing apparatus which is a sender of the software cell and the information processing apparatus ID of the information processing controller in the information processing apparatus, and further identifiers (main processor ID and sub processor IDs) of the main processor 21 and the sub processors 23 included in the information processing controller in the information processing apparatus.

The sender ID and the response destination ID respectively include the same information about an information processing apparatus which is a destination of the software cell and an information processing apparatus which is a response destination of a result of execution of the software cell.

The cell interface is information necessary for utilizing the software cell, and includes a global ID, necessary sub processor information, a sandbox size, and a preceding software cell ID.

The global ID allows unique identification of the software cell throughout the entire network, and is produced on the basis of the sender ID and the date/time (date and time) of production or transmission of the software cell.

The necessary sub processor information sets therein the number of sub processors necessary for executing the software cell. The sandbox size sets therein memory capacities in the main memory 26 and the LS 24 of each sub processor 23 which are necessary for executing the software cell.

The preceding software cell ID is an identifier of a preceding one of software cells belonging to one group that requires sequential execution of data such as streaming data.

An execution section of a software cell is formed from a DMA command, a program, and data. The DMA command includes a series of DMA commands necessary to start the program, and the program includes sub processor programs to be executed by the sub processors 23. The data here is data to be processed by the program including the sub processor programs.

Further, the DMA command includes a load command, a kick command, a function program execution command, a status request command, and a status return command.

The load command is a command for loading information in the main memory 26 into the LS 24 of a sub processor 23, and includes, in addition to the load command itself, a main memory address, a sub processor ID, and an LS address. The main memory address indicates an address of a predetermined area in the main memory 26, from which the information is loaded. The sub processor ID and the LS address indicate an identifier of the sub processor 23 and an address of the LS 24, to which the information is loaded.

The kick command is a command for starting execution of a program, and includes, in addition to the kick command itself, a sub processor ID and a program counter. The sub processor ID identifies a sub processor 23 for kicking, and the program counter provides an address for a program counter for execution of the program.

The function program execution command is a command, as hereinafter described, by which a certain information processing apparatus requests another information processing apparatus to execute a function program. The information processing controller in an information processing apparatus having received the function program execution command identifies a function program to be started from a function program ID hereinafter described.

The status request command is a command by which it is requested that apparatus information regarding a current operation status (situation) of an information processing apparatus indicated by the destination ID be transmitted to an information processing apparatus indicated by the response destination ID. While the function program is hereinafter described, it is a program that is categorized into a function program in a configuration diagram shown in FIG. 6 of software stored in the main memory 26 of an information processing controller. The function program is loaded into the main memory 26 and executed by the main processor 21.

The status return command is a command by which an information processing apparatus having received the above-mentioned status request command responds, with its apparatus information, to an information processing apparatus indicated by the response destination ID that is included in the status request command. The status return command stores the apparatus information into the data area of the execution section.

Figure 4:
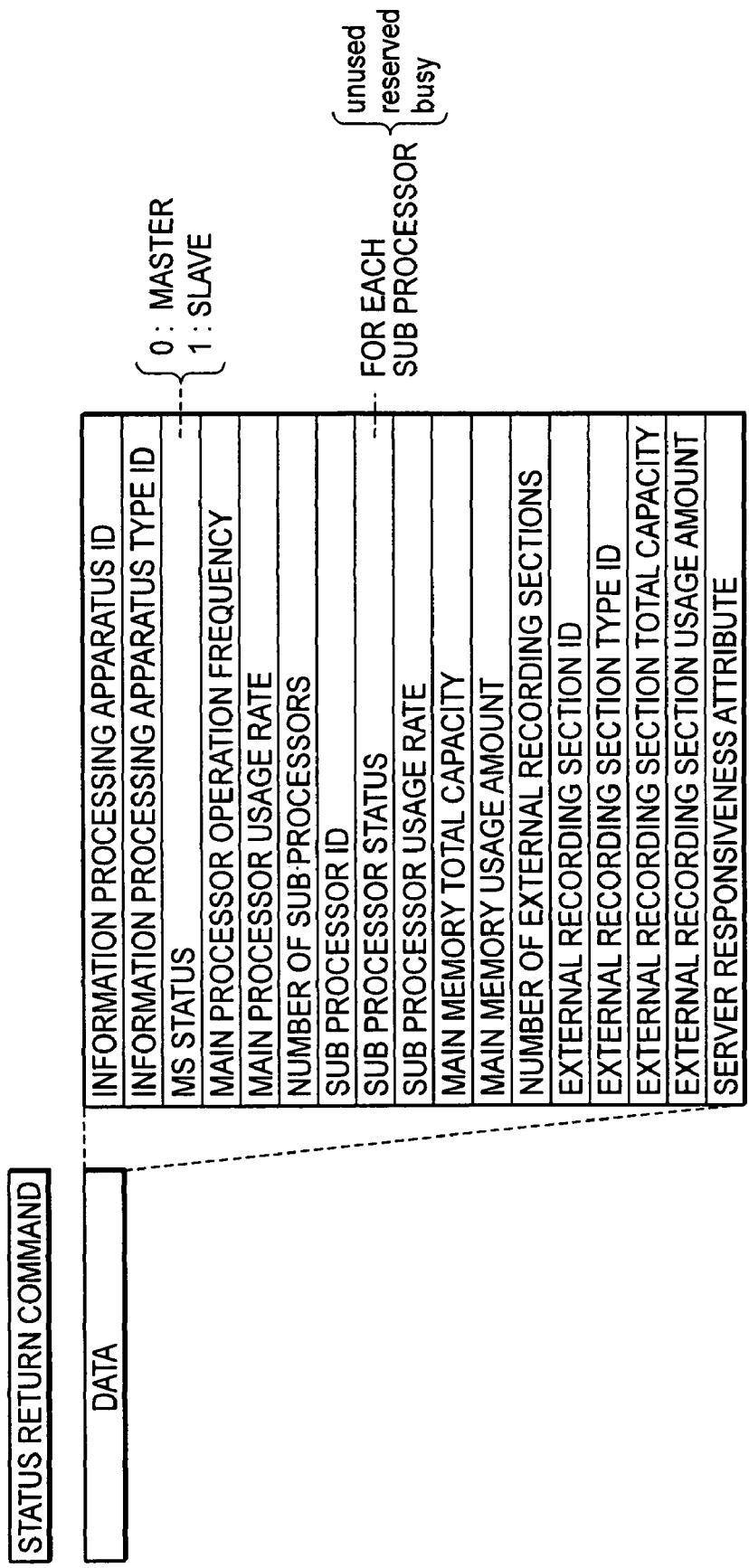
FIG. 4 is a diagram showing a data area of the software cell in a case where a DMA command is a status return command.

FIG. 4 shows a structure of the data area of a software cell where the DMA command is the status return command.

The information processing apparatus ID is an identifier for identifying an information processing apparatus that includes an information processing controller, and represents the ID of an information processing apparatus that transmits the status return command. The information processing apparatus ID is produced by the main processor 21 included in the information processing apparatus when the power is supplied, on the basis of a date/time at which the power is supplied, the network address of the information processing apparatus, the number of sub processors 23 included in the information processing controller in the information processing apparatus, and the like.

An information processing apparatus type ID includes a value representative of one advantage of the information processing apparatus. The advantage of the information processing apparatus is, e.g., various types of AV equipment such as a DTV (Digital Television) hereinafter described, a home server, or the like. Further, the information processing apparatus type ID may be of a type representing a function of the information processing apparatus, such as video/audio recording or video/audio reproduction. The value representative of an advantage or a function of an information processing apparatus is determined in advance, and by reading out the information processing apparatus type ID, the advantage or the function of the information processing apparatus can be grasped.

An MS (Master/Slave) status represents which one of a master apparatus and a slave apparatus the information processing apparatus is operating as, as hereinafter described. Where the MS status is set to 0, it indicates that the information processing apparatus is operating as a master apparatus, and where the MS status is set to 1, it indicates that the information processing apparatus is operating as a slave apparatus.

A main processor operation frequency represents an operation frequency of the main processor 21 in the information processing controller. A main processor usage rate represents a usage rate in the main processor 21 of all of programs currently operating in the main processor 21. The main processor usage rate is a value representing the ratio of the processing capacity being currently used to the total processing capacity of the main processor of interest, and is calculated, e.g., in a unit of MIPS, which is a unit for evaluation of the processor processing capacity, or on the basis of a processor utilization time per unit time. This similarly applies also to a sub processor usage rate hereinafter described.

The number of sub processors represents the number of sub processors 23 included in the information processing controller. A sub processor ID represents an identifier for identifying each of the sub processors 23 in the information processing controller.

A sub processor status represents a status of each sub processor 23, and includes an unused status, a reserved status, a busy status. The unused status indicates that the sub processor is neither used at present nor reserved for use. The reserved status indicates that the sub processor is not used at present but reserved for use. The busy status indicates that the sub processor is currently used.

The sub processor usage rate represents a usage rate in the sub processor of a program being executed by the sub processor or being reserved for execution in the sub processor. That is, the sub processor usage rate indicates a current usage rate where the sub processor status is busy, and indicates an estimated usage rate under which the sub processor is planned to be used later where the sub processor status is reserved.

A set of the sub processor ID, sub processor status, and sub processor usage rate is set to one sub processor 23, and thus, as many sets as the number of sub processors 23 in one information processing controller are set.

A main memory total capacity and a main memory usage amount represent a total capacity and a capacity being currently used of the main memory 26 connected to the information processing controller, respectively.

The number of external recording sections represents the number of external recording sections 28 connected to the information processing controller. An external recording section ID is information for uniquely identifying an external recording section 28 connected to the information processing controller. An external recording section type ID represents a type of the external recording section 28 (e.g., a hard disk, a CD±RW, a DVD±RW, a memory disk, an SRAM, a ROM, or the like).

An external recording section total capacity and an external recording section usage amount represent a total capacity and a current capacity of an external recording section 28 identified by the external recording section ID, respectively.

A "server-responsiveness" attribute represents whether or not the corresponding information processing apparatus has an attribute as a server.

A set of the external recording section ID, external recording section type ID, external recording section total capacity, and external recording section usage amount is set to one external recording section 28, and thus, as many sets as the number of external recording sections 28 connected to the information processing controller is set. That is, where a plurality of external recording sections are connected to one information processing controller, different external recording section IDs are allocated to the respective external recording sections, and the external recording section type IDs, external recording section total capacities, and external recording section usage amounts are also managed separately from each other.

(Execution of a Software Cell)

The main processor 21 included in the information processing controller in a certain information processing apparatus produces a software cell having such a configuration as described above, for transmission to a different information processing apparatus and the information processing controller in the different information processing apparatus via the network 9. The information processing apparatus as the sender, the information processing apparatus as the destination, the information processing apparatus as a response destination, and the information processing controllers in the apparatus are identified by the above-mentioned sender ID, destination ID, and response destination ID, respectively.

The main processor 21 included in the information processing controller in the information processing apparatus having received the software cell stores the software cell into the main memory 26. Further, the main processor 21 of the destination reads out the software cell, and processes the DMA command included therein.

Specifically, the main processor 21 of the destination first executes the load command. As a result, information is loaded from a main memory address indicated by the load command into a predetermined area of the LS 24 in a sub processor specified by the sub processor ID and the LS address included in the load command. The information loaded here is a sub processor program or data or some other indicated data included in the received software cell.

Next, the main processor 21 outputs a kick command to a sub processor indicated by the sub processor ID included in the kick command together with a program counter similarly included in the kick command.

The indicated sub processor executes the sub processor program in accordance with the kick command and the program counter. And the sub processor stores a result of the execution into the main memory 26, after which it notifies the main processor 21 of completion of the execution.

Note that the processor executing the software cell in the information processing controller in the information processing apparatus as the destination is not limited to a sub processor 23, but it is possible to designate the main processor 21 so as to execute a main memory program such as a function program included in the software cell.

In this case, the information processing apparatus as the sender transmits, to the information processing apparatus as the destination, a software cell which includes a main memory program and data to be processed by the main memory program in place of the sub processor program and whose DMA command is the load command, to cause the main memory program and the data processed thereby to be stored into the main memory 26. Next, the information processing apparatus as the sender transmits, to the information processing apparatus as the destination, a software cell which includes a main processor ID and a main memory address as to the information processing controller in the information processing apparatus as the destination, an identifier for identifying the main memory program such as a function program ID hereinafter described, and a program counter and whose DMA command is the kick command or the function program execution command, to cause the main processor 21 to execute the main memory program.

As described above, in one embodiment of the network system of this invention, an information processing apparatus as a sender transmits a sub processor program or a main memory program in the form of a software cell to an information processing apparatus as a destination, and also causes the sub processor program to be loaded into a sub processor 23 included in the information processing controller in the information processing apparatus as the destination, whereby the information processing apparatus as the sender can cause the information processing apparatus as the destination to execute the sub processor program or the main memory program.

Where the program included in the received software cell is a sub processor program, the information processing controller in the information processing apparatus as the destination loads the sub processor program into a designated sub processor. And the information processing controller causes the sub processor to execute the sub processor program or the main memory program included in the software cell.

Accordingly, even if the user does not operate the information processing apparatus as the destination, the sub processor program or the main memory program can be executed automatically by the information processing controller in the information processing apparatus as the destination.

In this manner, any information processing apparatus can acquire, where its information processing controller does not include a sub processor program or a main memory program such as a function program, such programs from another information processing apparatus connected to the network. Further, sub processors transfer data therebetween in accordance with the DMA system, and the sandboxes mentioned above are used, whereby even if it is necessary to process data at multiple stages within one information processing controller, the processing can be executed at a high speed and with a high degree of security.

Figure 5:
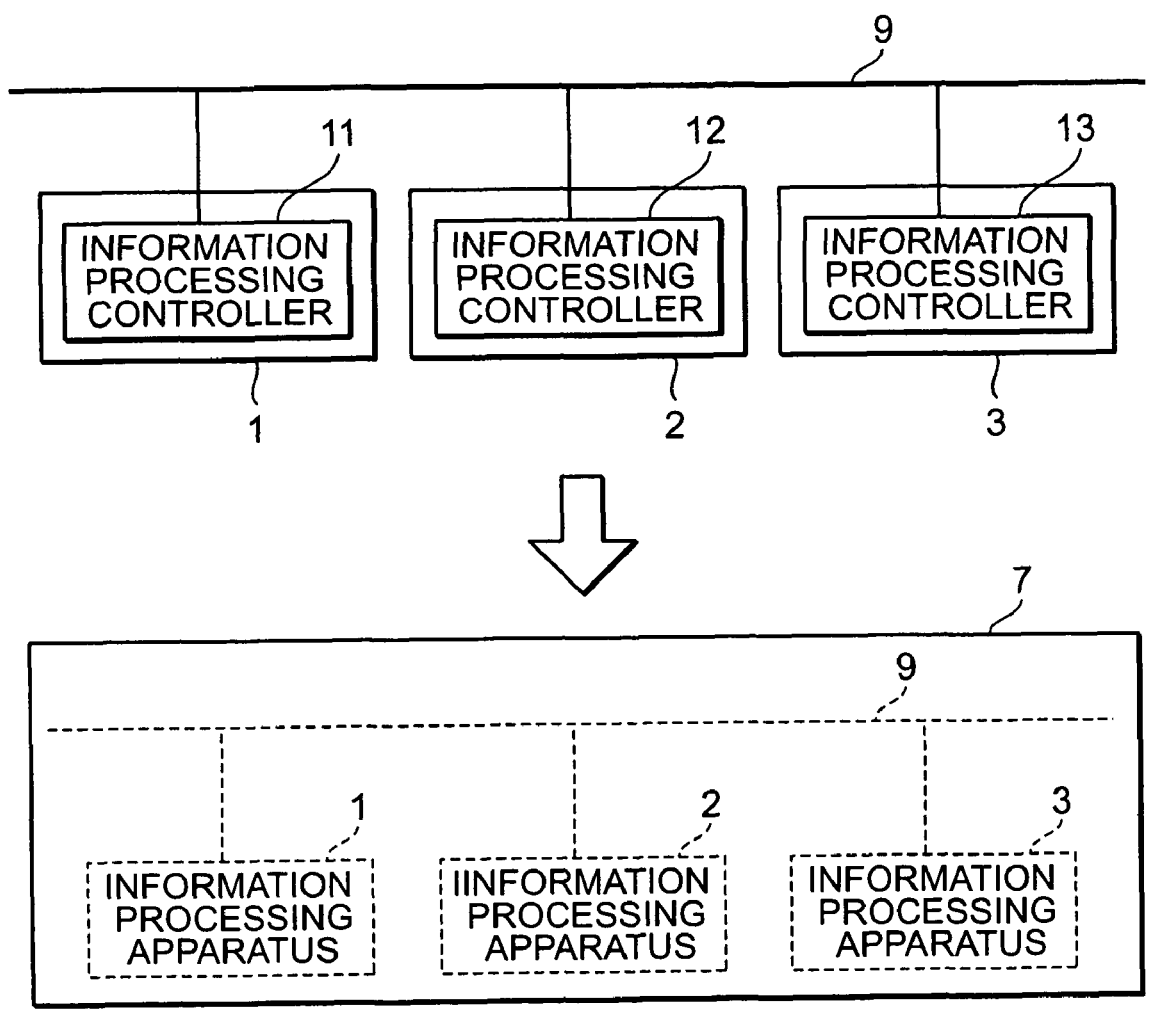
FIG. 5 is a diagram showing how a plurality of information processing apparatus operate as a virtual single information processing apparatus.

As a result of distributed processing through use of a software cell, the plural information processing apparatus 1, 2, 3 connected to the network 9 as shown at the upper stage of FIG. 5 operate as a virtual single information processing apparatus 7 as shown at the lower stage of FIG. 5. However, to do so, processes described below must be executed by the following configuration.

(Software Configuration of the System and Loading of a Program)

Figure 6:
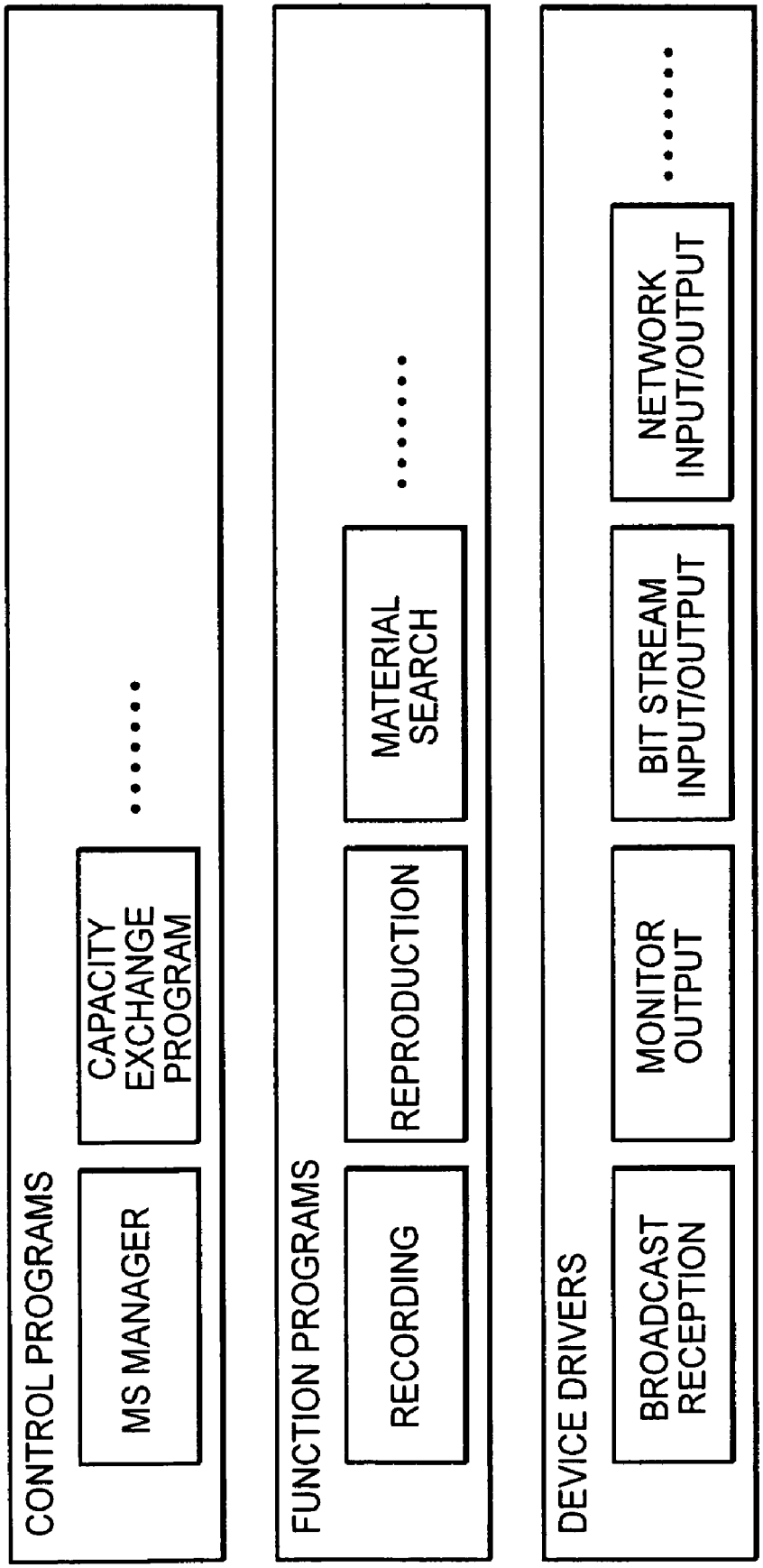
FIG. 6 is a diagram showing an example of a software configuration of the information processing controller.

FIG. 6 shows a configuration of software to be stored by the main memories 26 of the individual information processing controllers. These pieces of software (programs) are recorded in an external recording section 28 connected to the corresponding information processing controller before the power is supplied to the information processing apparatus.

The programs are categorized into control programs, function programs, and device drivers according to their function or characteristic.

The control programs are common to each of the information processing controllers, and executed by the main processor 21 of the information processing controller. The control programs include an MS (Master/Slave) manager and a capacity exchange program hereinafter described.

The function programs are executed by the main processors 21, and include programs for recording, reproduction, and material search which are provided for each information processing controller so as to correspond to the each information processing apparatus.

The device drivers are provided for input and output (transmission and reception) of each information processing controller (information processing apparatus), and include broadcast reception, monitor output, bit steam input/output, network input/output, which are provided for each information processing controller so as to correspond to each information processing apparatus.

When the power is supplied to an information processing apparatus in a state wherein the information processing apparatus is physically connected to the network 9 by, e.g., inserting a cable, and consequently the information processing apparatus is connected to the network 9 also electrically and functionally, the main processor 21 of the information processing controller of the information processing apparatus loads the programs belonging to the control programs and the programs belonging to the device drives into the main memory 26.

As a loading procedure, the main processor 21 first causes the DC 27 to execute a reading out instruction to read out the programs from the external recording section 28, and then causes the DMAC 25 to execute a writing instruction to write the programs into the main memory 26.

The programs belonging to the function programs may be configured such that only a necessary one of the programs is loaded when necessary, or otherwise such that all of them are loaded immediately after the main power is supplied similarly to the programs belonging to the other categories.

Here, the programs belonging to the function programs need not necessarily be recorded in the external recording sections 28 of all of the information processing apparatus connected to the network, but as long as they are recorded in an external recording section 28 of any one of the information processing apparatus, they can be loaded from another information processing apparatus by the method described above. As a result, the function programs can be executed by the virtual single information processing apparatus 7 as shown at the lower stage of FIG. 5.

Here, a function program processed by the main processor 21 as described above sometimes operates in cooperation with a sub processor program processed by a sub processor 23. Therefore, when the main processor 21 reads out a function program from an external recording section 28 and writes the function program into the main memory 26, where a sub processor program that is to operate in cooperation with the function program exists, also the sub processor program is written into the same main memory 26 together. In this case, the number of such sub processor programs that operate cooperatively may be either a single number or a plural number. Where the number is a plural number, all of the sub processor programs that operate cooperatively are written into the main memory 26. Each of the sub processor programs written in the main memory 26 is thereafter written into the LS 24 of a sub processor 23 and operates in cooperation with the function program to be processed by the main processor 21.

As shown by the software cell of FIG. 3 above, an identifier that can uniquely identify a function program is allocated as a function program ID to each of the function programs. The function program ID is determined from the date/time of creation, the information processing apparatus ID, and the like at the stage of creation of the function program.

And a sub processor program ID is allocated to a sub processor program, whereby the sub processor program can be identified uniquely. The sub processor program ID to be allocated may be an identifier having some relationship with the function program ID of a function program which is the other party of the cooperative operation, such as, e.g., an identifier formed form the function program ID as a parent number and a branch number added to the tail end of the parent number. Alternatively, it may be an identifier having no relationship with the function program ID of a function program which is the other party of the cooperative operation. Anyway, where a function program and a sub processor program should operate cooperatively with each other, it is necessary for each of them to mutually retain the program ID which is the identifier of the other party in the program itself. Also where a function program should operate cooperatively with a plurality of sub processor programs, it is necessary for the function program to retain the sub processor program IDs of all of the sub processor programs.

The main processor 21 secures, in the main memory 26, an area for storing apparatus information (information regarding an operation status) of the information processing apparatus in which the main processor 21 itself operates, and records the information as an apparatus information table of the self apparatus. The apparatus information here is items of information, which includes the information processing apparatus ID and the subsequent items shown in FIG. 4 above.

(Determination of the Master/Slave in the System)

In the network system described above, upon supply of the main power to a certain information processing apparatus, the main processor 21 of the information processing controller of the information processing apparatus loads the master/slave manager (hereinafter referred to as "MS manager") into the main memory 26 for execution.

After the MS manager detects the connection to the network 9 of the information processing apparatus in which it operates, it confirms the presence of the other information processing apparatus connected to the same network 9. The "connection" or "presence" here represents the connection to the network 9 of the information processing apparatus not only physically but also electrically and functionally.

Further, the information processing apparatus in which the MS manager itself operates is hereinafter referred to as "self apparatus", and any other information processing apparatus is referred to as "different apparatus". Also the term "corresponding apparatus" represents the corresponding information processing apparatus.

A method by which the MS manager confirms the presence of a different information processing apparatus connected to the same network 9 is described in the following.

The MS manager produces a software cell that designates the status request command as the DMA command, and designates the corresponding information processing apparatus as the sender ID and the response destination ID, but does not specify the destination ID, for transmission to the network to which the corresponding information processing apparatus is connected, and sets a timer for network connection confirmation. The timeout time of the timer is, e.g., 10 minutes.

Where a different information processing apparatus is connected to the network system, the different apparatus receives the software cell including the status request command, and transmits a software cell that designates the status return command as the DMA command and includes apparatus information of the self apparatus (different apparatus) as the data, to an information processing apparatus which is specified by the above-mentioned response destination ID and which has issued the status request command. The software cell as the status return command includes at least information for specifying the different apparatus (information processing apparatus ID, information regarding the main processor, information regarding a sub processor, or the like), and the MS status of the different apparatus.

The MS manager of the information processing apparatus having issued the status request command supervises reception of the software cell as the status return command transmitted from the different apparatus on the network until timeout occurs with the above-mentioned timer for network connection confirmation. As a result, where the status return command indicative of the MS status=0 (master apparatus) is received, the MS status in the apparatus information table of the self apparatus is set to 1. Consequently, the corresponding apparatus becomes a slave apparatus.

On the other hand, where no status return command is received within the time until timeout occurs with the above-mentioned timer for network connection confirmation, or where the status return command indicative of the MS status=0 (master apparatus) is not received, the MS status in the apparatus information table of the self apparatus is set to 0. Consequently, the corresponding apparatus becomes a master apparatus.

That is, when a new information processing apparatus is connected to the network 9 in a state wherein no apparatus is connected to the network 9 or in a state wherein a master apparatus does not exist on the network 9, the corresponding apparatus is automatically set as a master apparatus. On the other hand, when a new information processing apparatus is connected to the network 9 in a state wherein a master apparatus exists already on the network 9, the corresponding apparatus is automatically set as a slave apparatus.

In any of the master apparatus and slave apparatus, the MS manager periodically transmits the status request command to a different apparatus on the network 9 to inquire about status information to supervise the situation of the different apparatus. As a result, when the connection state of the network 9 undergoes a variation such as when the main power supply to an information processing apparatus connected to the network 9 is cut or an information processing apparatus is disconnected from the network 9 and consequently the status return command is not returned from the particular different apparatus within a predetermined period of time set for determination in advance, or when a new information processing apparatus is connected to the network 9, the information is conveyed to a capacity exchange program hereinafter described.

(Acquisition of Apparatus Information in the Master Apparatus and a Slave Apparatus)

When the main processor 21 receives, from the MS manager, a notification of an inquiry about a different apparatus on the network 9 and completion of setting of the MS status of the self apparatus, it executes a capacity exchange program.

The capacity exchange program acquires, where the self apparatus is a master apparatus, apparatus information about all of different apparatus connected to the network 9, i.e., apparatus information about respective slave apparatus.

The acquisition of apparatus information about a different apparatus can be performed, as described above, such that a software cell that designates the status request command as the DMA command is produced for transmission to the different apparatus, and thereafter a software cell that designates the status return command as the DMA command and includes apparatus information about the different apparatus as the data, is received from each of the different apparatus.

The capacity exchange program secures an area for storing apparatus information of all of the different apparatus (respective slave apparatus) connected to the network 9 in the main memory 26 of the self apparatus, and records the information as apparatus information tables of the different apparatus (slave apparatus), similarly to the apparatus information table of the self apparatus as the master apparatus.

That is, in the main memory 26 of the master apparatus, the apparatus information of all of the information processing apparatus connected to the network 9 including the self apparatus is recorded as the apparatus information tables.

On the other hand, where the self apparatus of the capacity exchange program is a slave apparatus, the capacity exchange program acquires apparatus information about all of the different apparatus connected to the network 9, i.e., apparatus information about the master apparatus and all of the slave apparatus other than the self apparatus, and records information processing apparatus IDs and MS statuses included in the apparatus information into the main memory 26 of the self apparatus.

That is, in the main memory 26 of each slave apparatus, the apparatus information about the self apparatus is recorded as an apparatus information table, and the information processing apparatus IDs and the MS statuses of all of the master apparatus and the slave apparatus connected to the network 9 other than the self apparatus are recorded as separate apparatus information tables.

Further, in any of the master apparatus and the slave apparatus, when the capacity exchange program receives a notification that an information processing apparatus is newly connected to the network 9, from the MS manager as described above, it acquires apparatus information of the information processing apparatus and records the apparatus information into the main memory 26 as described above.

Note that the MS manager and the capacity exchange program may be executed not only by the main processor 21 but by any sub processor 23 as well. Further, the MS manager and the capacity exchange program preferably are resident programs that operate normally while the main power is supplied to the information processing apparatus.

In any of the master apparatus and the slave apparatus, when the capacity exchange program is notified from the MS manager as described above that the main power supply to an information processing apparatus connected to the network 9 is disconnected or an information processing apparatus is disconnected from the network 9, it deletes the apparatus information table of the information processing apparatus from the main memory 26 of the self apparatus.

Further, where the information processing apparatus disconnected from the network 9 is the master apparatus, another master apparatus is determined newly by a method such as described below.

Specifically, e.g., each of the information processing apparatus that are not disconnected from the network 9 replaces the information processing apparatus IDs of the self apparatus and the different apparatus with numerical values, and compares the information processing apparatus ID of the self apparatus with the information processing apparatus IDs of the different apparatus. Where the information processing apparatus ID of the self apparatus is the lowest of the IDs of the information processing apparatus that are not disconnected from the network 9, the slave apparatus changes itself to the master apparatus and sets the MS status to 0. Then, it operates as the master apparatus, and acquires apparatus information of all of the different apparatus (slave apparatus) connected to the network 9 for recording into the main memory 26 as described above.

(Specific Examples of Each Information Processing Apparatus and the System)

Figure 7:
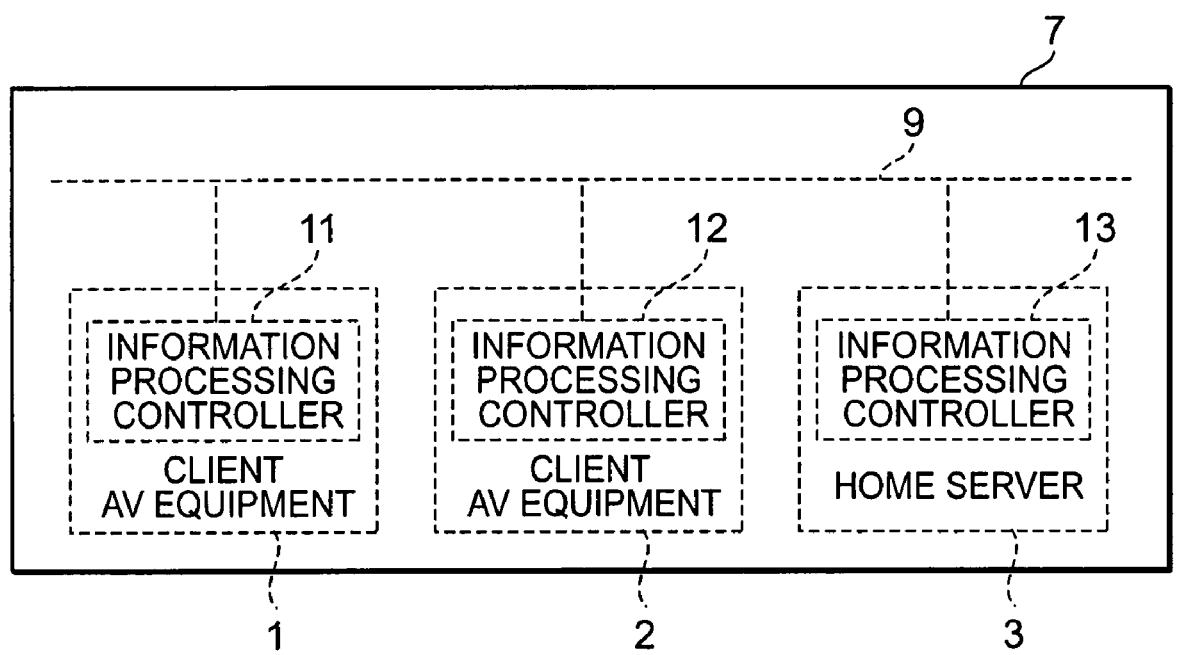
FIG. 7 is a diagram showing an example of a networked AV system of this invention.

FIG. 7 shows an example in which a networked AV system is configured by adopting client AV equipment such as DTV (Digital Television) and a home server as the information processing apparatus 1, 2, 3 interconnected via the network 9. Here, the information processing apparatus 1, 2 are the client AV equipment, and the information processing apparatus 3 is the home server.

Figure 8:
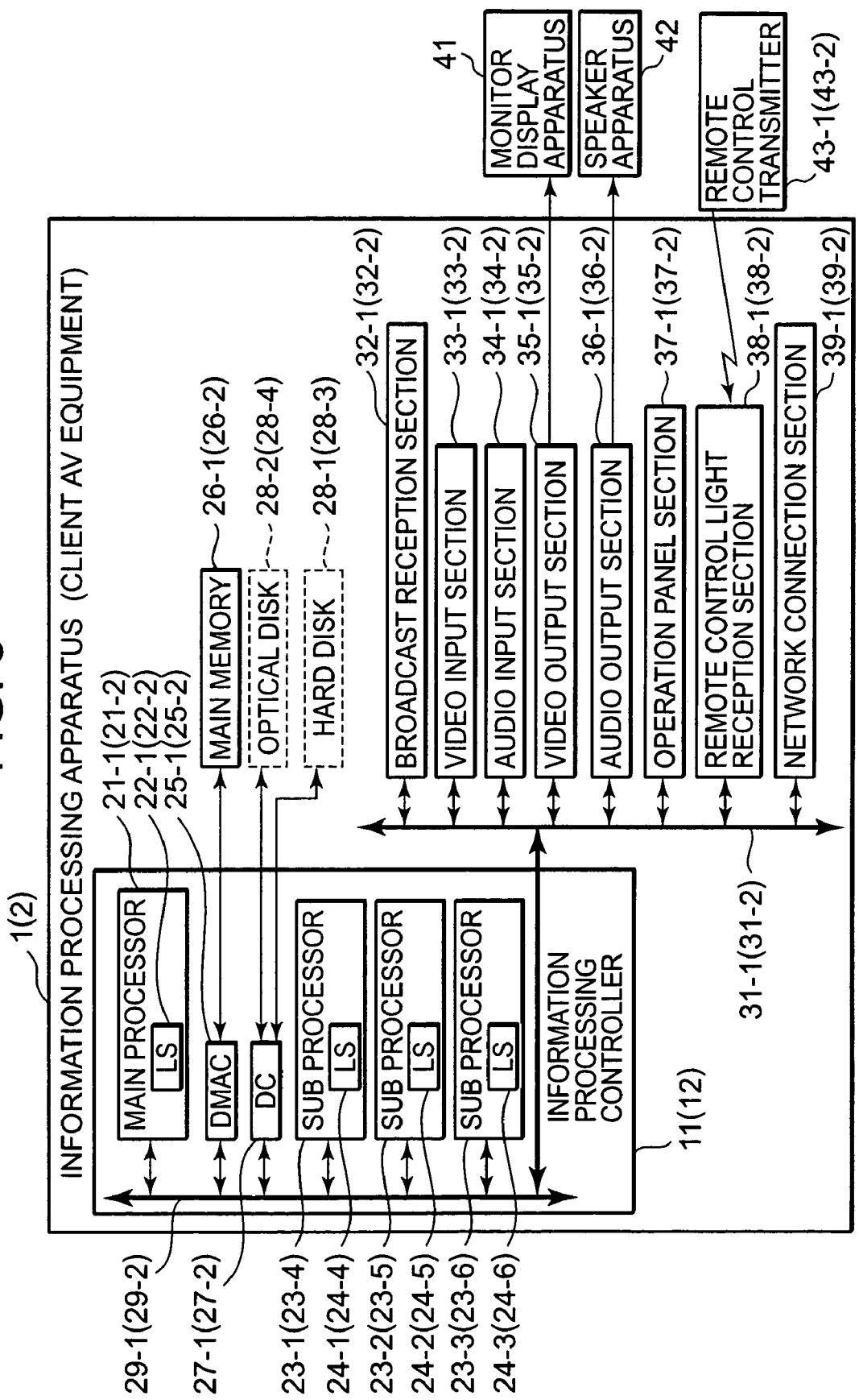
FIG. 8 is a diagram showing a hardware configuration of client AV equipment in the system of FIG. 7.

FIG. 8 is a diagram showing a configuration of the client AV equipment corresponding to the information processing apparatus 1 of FIG. 1. As shown in the figure, the client AV equipment can connect thereto a hard disk drive as the external recording section 28-1 shown in FIG. 1 above, and it is configured such that an optical disk drive such as a DVD±R/RW, a CD±R/RW, a Blu-ray Disc (registered trademark) can be loaded therein as the external recording section 28-2 shown in FIG. 1 above. However, in this client AV equipment, these external recording sections 28-1, 28-2 are not necessarily essentially required as sections for recording content.

To a bus 31-1 that is connected to the bus 29-1 of the information processing controller 11, there are connected a broadcast reception section 32-1, a video input section 33-1, an audio input section 34-1, a video output section 35-1, an audio output section 36-1, an operation panel section 37-1, a remote control light reception section 38-1, and a network connection section 39-1 are connected.

The broadcast reception section 32-1, video input section 33-1, and audio input section 34-1 receive a broadcasting signal, or input a video signal and an audio signal from the outside of the information processing apparatus 1 for conversion into digital data of a predetermined format, and signal the digital data to the bus 31-1 for processing by the information processing controller 11. The video output section 35-1 and the audio output section 36-1 process video data and audio data signaled from the information processing controller 11 to the bus 31-1, and signal the video data and the audio data as they are or converted into analog signals, to the outside of the information processing apparatus 1. The remote control light reception section 38-1 receives a remote control infrared signal from a remote control transmitter 43-1. Further, a monitor display apparatus 41 is connected to the video output section 35-1 of the digital television and a speaker apparatus 42 is connected to its audio output section 36-1.

The information processing controller 11 includes the main processor 21-1, the sub processors 23-1, 23-2, 23-3, the DMAC (Direct Memory Access Controller) 25-1, the DC (Disk Controller) 27-1, and the bus 29-1. The main processor 21-1 has an LS (Local Storage) 22-1, and the respective sub processors 23-1, 23-2, 23-3 include LSs (Local Storages) 24-1, 24-2, 24-3.

Further, also the client AV equipment corresponding to the information processing apparatus 2 of FIG. 1 has a similar hardware configuration.

Figure 9:
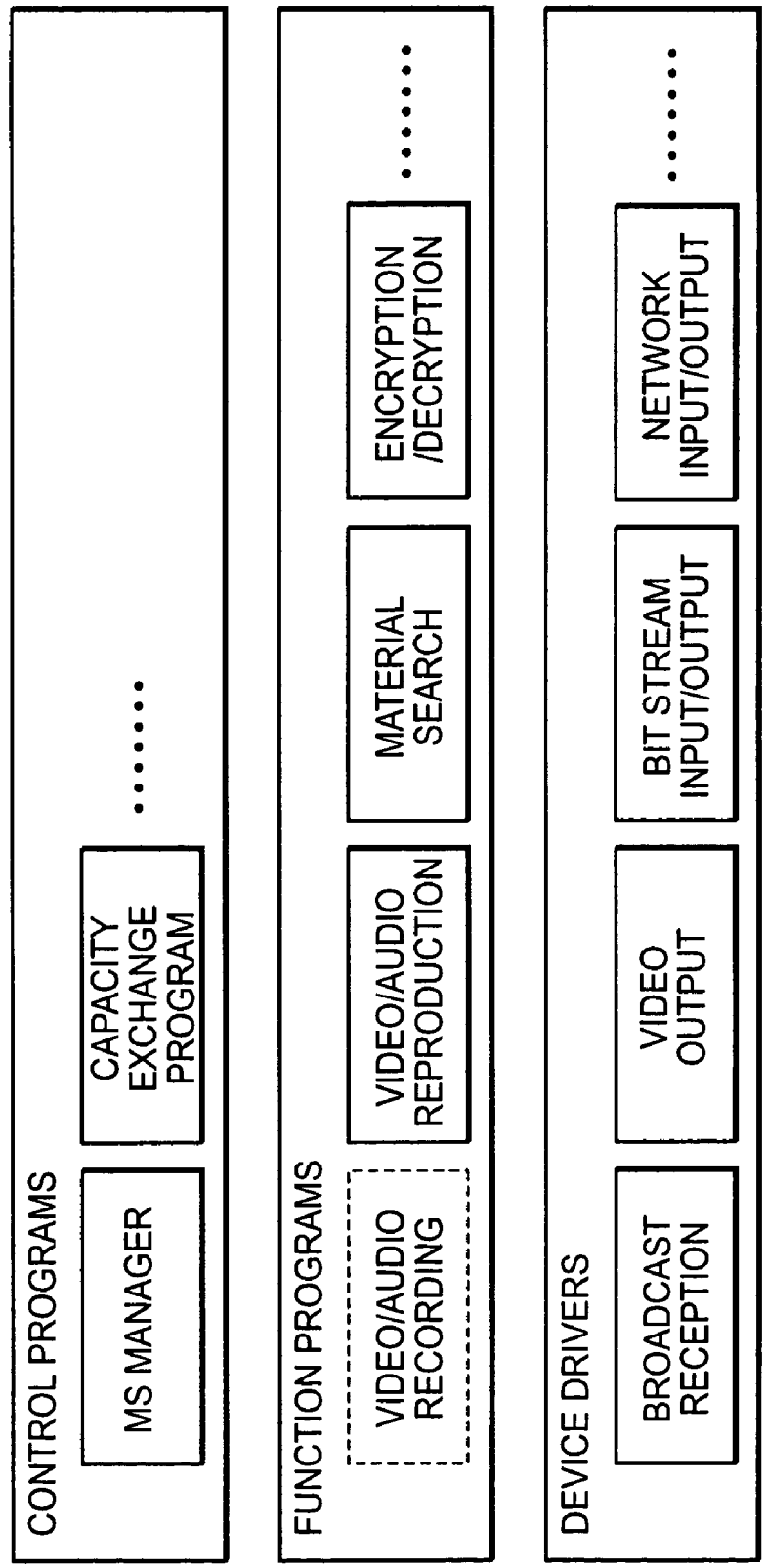
FIG. 9 is a diagram showing a software configuration of the client AV equipment of FIG. 8.

Furthermore, the client AV equipment which are the information processing apparatus 1, 2 have, as shown in FIG. 9, control programs, function programs, and device drivers. The control programs include the MS manager and the capacity exchange program. The function programs are to implement functions which the client AV equipment provide to the user, and include, e.g., a program for encrypting streams of original content inputted from the broadcast reception section 32-1, video input section 33-1, audio input section 34-1, and the like in real-time, and a program for reproduction while decrypting encrypted streams of content received from the network in real-time. Also a program for recording streams of content on the external recording section 28-1, 28-2 may be included, but this is not essential. The device drivers are programs supervising broadcast reception, monitor output, bit stream input/output, network input/output, and the like.

Figure 10:
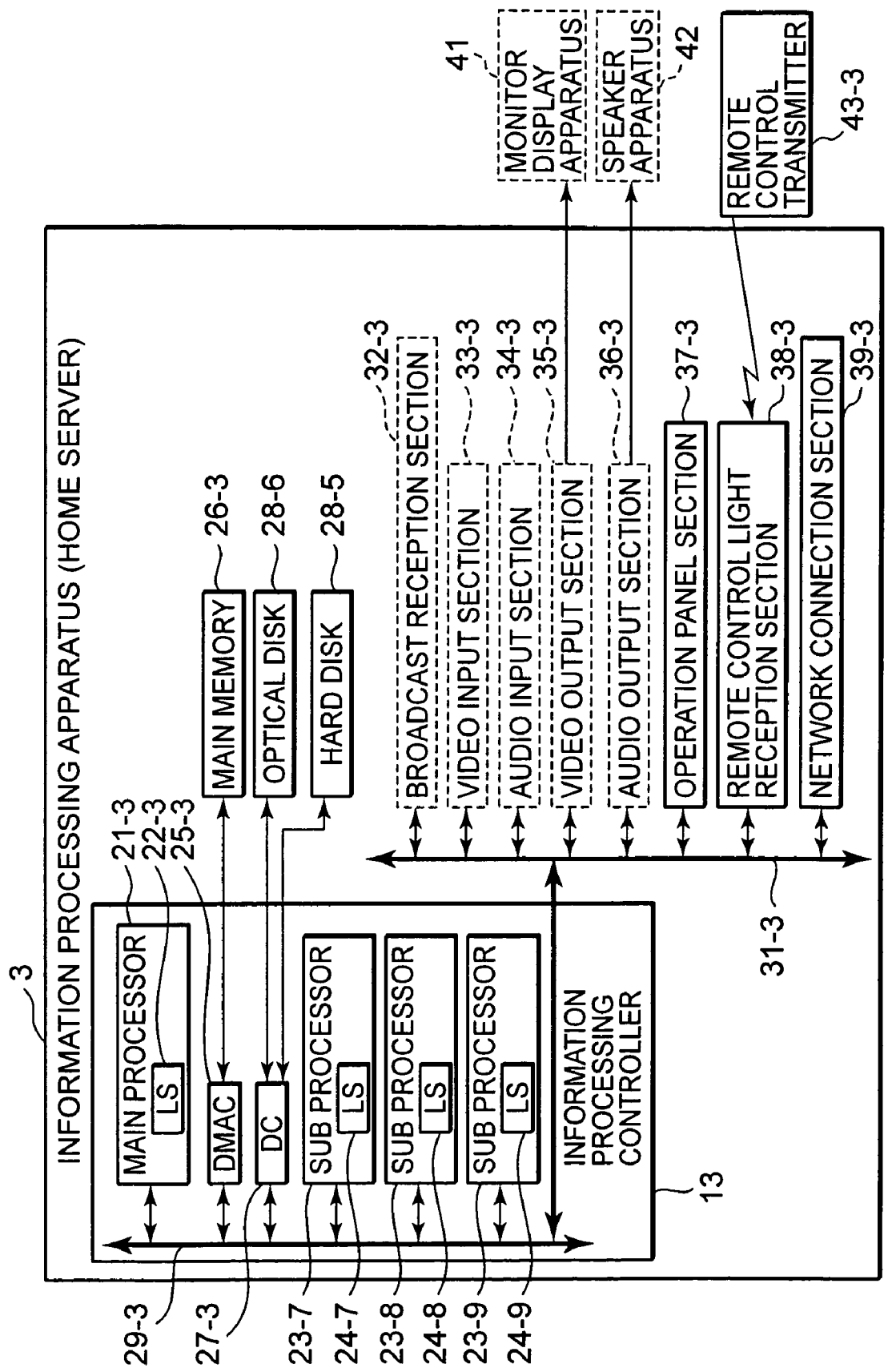
FIG. 10 is a diagram showing a hardware configuration of a home server in the system of FIG. 7.

FIG. 10 is a diagram showing the home server corresponding to the information processing apparatus 3 of FIG. 1. As shown in the figure, the home server is configured such that a hard disk drive can be loaded therein as an external recording section 28-5, and further an optical disk such as a DVD±R/RW, a CD±R/RW, a Blu-ray Disc (registered trademark) can be loaded therein as an external recording section 28-6.

To a bus 31-3 that is connected to a bus 29-3 of the information processing controller 13, there can be connected a broadcast reception section 32-3, a video input section 33-3, an audio input section 34-3, a video output section 35-3, an audio output section 36-3, an operation panel section 37-3, a remote control light reception section 38-3, and a network connection section 39-3. To the video output section 35-3 and the audio output section 36-3, there can be connected the monitor display apparatus 41 and the speaker apparatus 42. However, as long as the home server is used as a server, the broadcast reception section 32-3, video input section 33-3, audio input section 34-3, video output section 35-3, and audio output section 36-3 are not necessarily required.

The information processing controller 13 includes a main processor 21-3, sub processors 23-7, 23-8, 23-9, a DMAC (Direct Memory Access Controller) 25-3, a DC (Disk Controller) 27-3, and the bus 29-3. The main processor 21-3 has an LS (Local Storage) 22-3, and the respective sub processors 23-7, 23-8, 23-9 include LSs (Local Storages) 24-7, 24-8, 24-9.

Figure 11:
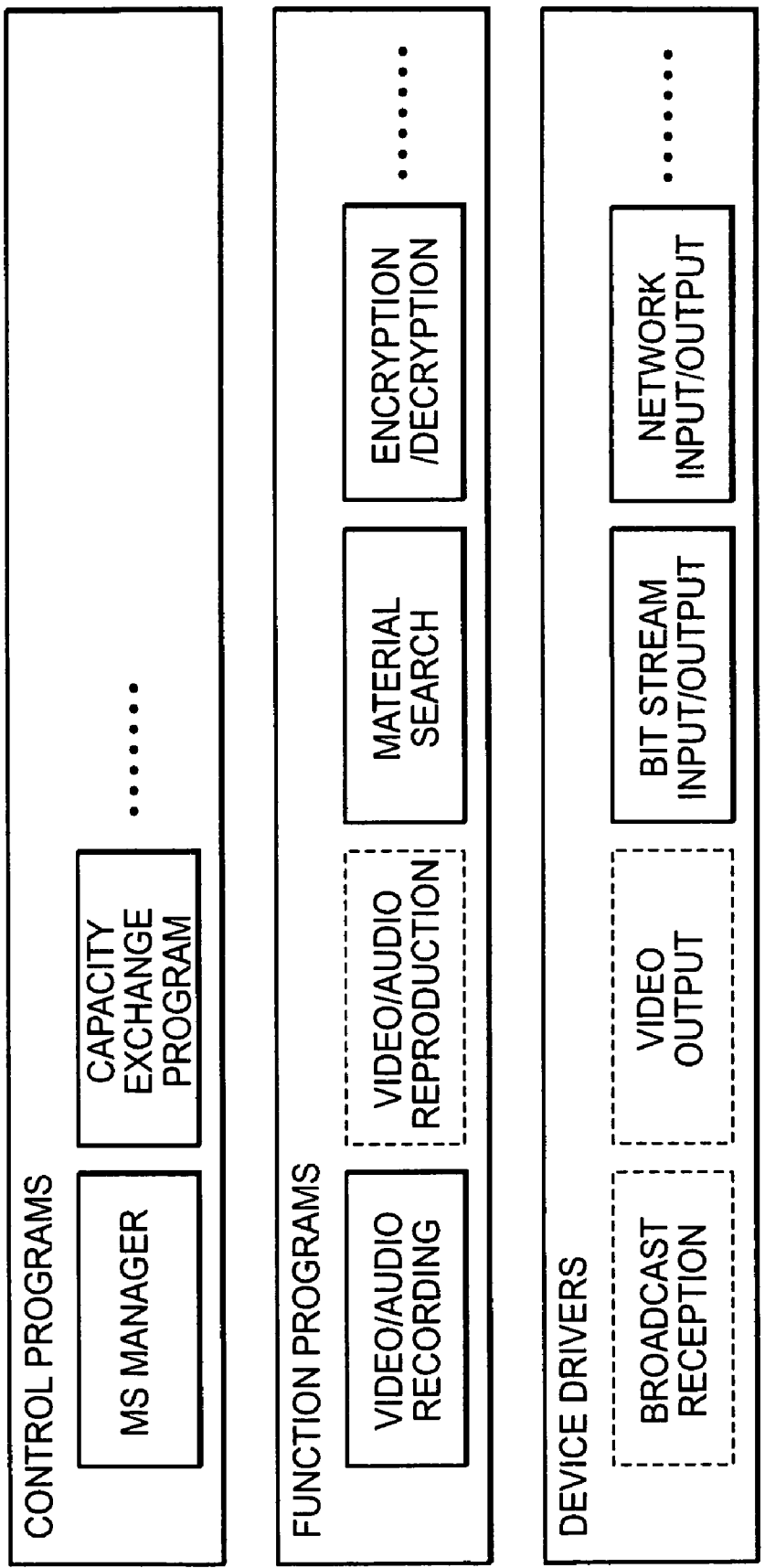
FIG. 11 is a diagram showing a software configuration of the home server of FIG. 10.

Further, the home server which is the information processing apparatus 3 has, as software, control programs, function programs, and device drivers, as shown in FIG. 11. It include the MS manager and the capacity exchange program as the control programs. The function programs are to implement functions which the home server provides to the user, and include, e.g., a program for recording for management on the external recording section 28-5, 28-6, encrypted streams of content received from the client AV equipment which are the information processing apparatus 1, 2 through the network 9, and a program for searching encrypted streams of content recorded on the external recording sections 28-5, 28-6 at a request from client AV equipment, for transmission through the network 9. The device drivers are programs for supervising broadcast reception, monitor output, bit stream input/output, network input/output, and the like. However, as long as the home server is used as a server, the device drivers for broadcast reception and monitor output are not required.

Next, operation of the above-described networked AV system will be described.

Figure 12:
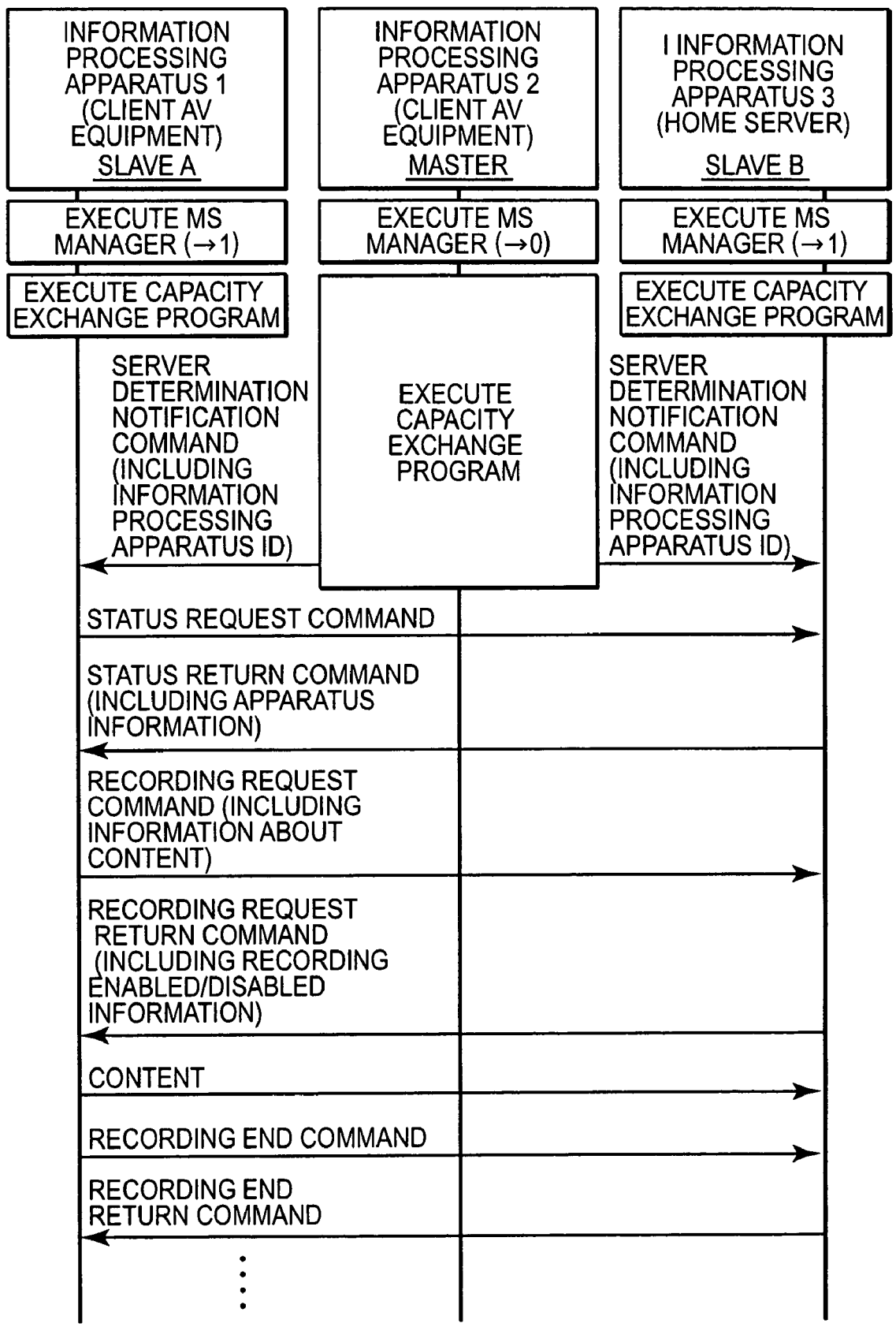
FIG. 12 is a diagram showing exchange of information between respective information processing apparatus when content is to be recorded in the system of FIG. 7.

FIG. 12 is a diagram showing exchange of information between the respective information processing apparatus when content is to be recorded.

In the network system shown in FIG. 7 above, it is assumed that: the client AV equipment which is the information processing apparatus 1 is set as a slave A (MS status=1); the client AV equipment which is the information processing apparatus 2 is set as the master (MS status=0); and the home server which is the information processing apparatus 3 is set as a slave B (MS status=1), in accordance with the master/slave determination procedure already described.

Once each of the information processing apparatus 1, 2, 3 has completed setting of the MS status of the self apparatus, it starts the capacity exchange program. The capacity exchange program of the information processing apparatus 2 which is the master apparatus acquires apparatus information about the respective apparatus including the self apparatus which are connected to the network 9. The capacity exchange program of the information processing apparatus 2 which is the master apparatus determines a server on the basis of at least the "server-responsiveness" attribute included in the acquired apparatus information. In this example, since only the "server-responsiveness" attribute of the apparatus information acquired from the home server which is the information processing apparatus 3 has a value representative of "server-responsive", the home server which is the corresponding information processing apparatus 3 is determined as the server.

When the server is determined, the capacity exchange program of the information processing apparatus 2 which is the master apparatus transmits a server determination notification command including the information processing apparatus ID of the server to the respective information processing apparatus 1, 2 which are slave apparatus.

Here, the information processing apparatus 1 which is the slave A holds the received information processing apparatus ID, and thereafter recognizes the information processing apparatus 3 indicated by this information processing apparatus ID as the server. On the other hand, the information processing apparatus 3 which is the slave B recognizes that the apparatus 3 itself has become the server from the received information processing apparatus ID. Note that also the information processing apparatus 2 which is the master apparatus holds the information processing apparatus ID of the information processing apparatus 3 determined as the server, and thereafter recognizes the information processing apparatus 3 indicated by this information processing apparatus ID as the server.

(Recording of Content)

Figure 13:
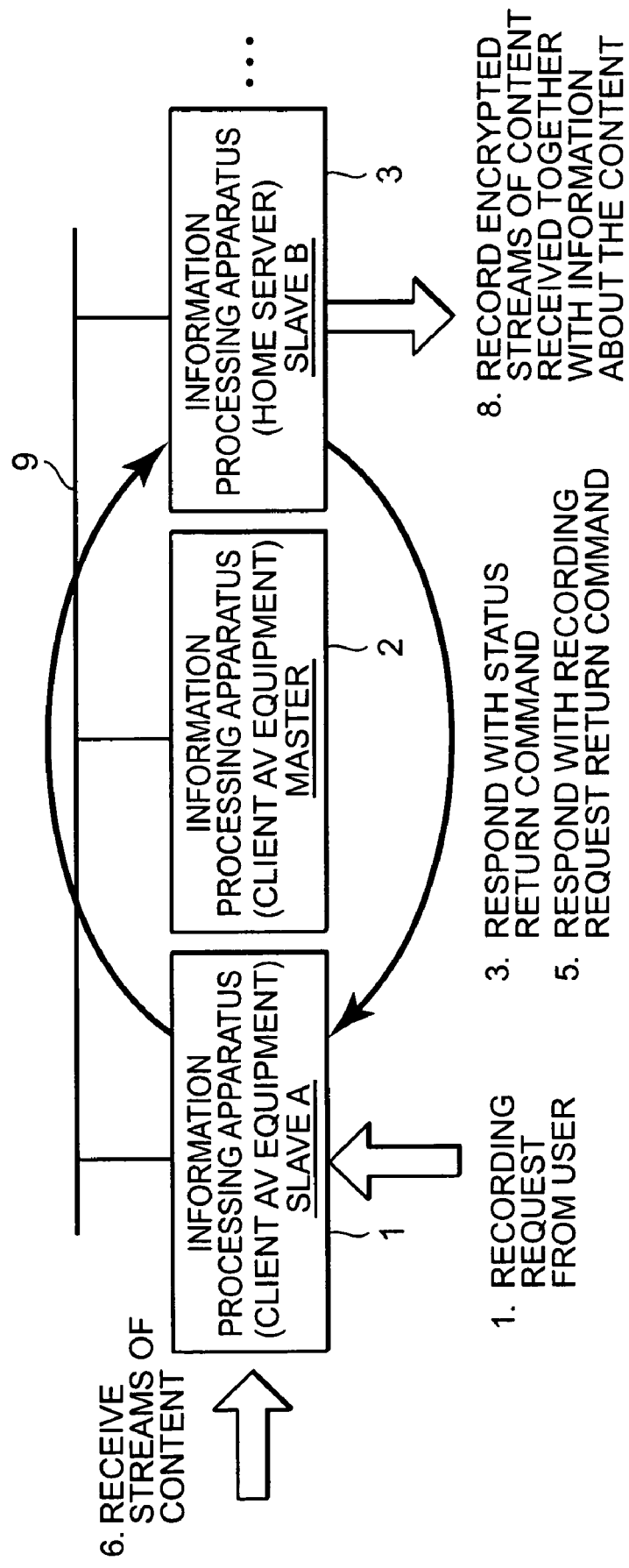
FIG. 13 is a diagram showing operation of recording content.

From here on, operation performed where content is to be recorded will be described with reference to FIG. 12 together with FIG. 13.

1. A user requests the information processing apparatus 1 (client AV equipment) which is the client AV equipment to record content by, e.g., operating the operation panel section 37-1.

2. When receiving this content recording request, the information processing apparatus 1 which is the client AV equipment outputs a status request command to the information processing apparatus 3 (home server) which is the server.

3. When receiving this status request command, the information processing apparatus 3 which is the server responds to the information processing apparatus 1 with a status return command.

4. After confirming that the server is connected to the network 9 on the basis of this status return command, the information processing apparatus 1 which is the client AV equipment outputs a recording request command to the information processing apparatus 3 which is the server. In this instance, added to the recording request command are a content ID for uniquely identifying the content for recording, an information processing apparatus ID of the self apparatus, information regarding the content such as meta information about the content. The meta information about the content includes a recording date/time, a content name, a bit rate, a size, a content category, a comment. That is, information regarding the content including the content ID, information processing apparatus ID, meta information about the content is transmitted to the information processing apparatus 3 which is the server.

5. When receiving the recording request command, the information processing apparatus 3 which is the server determines whether or not recording of the content is enabled, and responds to the information processing apparatus 1 with a recording request return command including information representative of the result.

Where the information processing apparatus 1 which is the client AV equipment has received a recording request return command including information which indicates that recording is disabled, it notifies the user who has made the recording request that the recording is disabled through the monitor display apparatus or the like, and suspends the recording process.

6. On the other hand, where the information processing apparatus 1 which is the client AV equipment has received a recording request return command including information which indicates that the recording is enabled, it receives streams of original content from the outside through, e.g., the broadcast reception section 32-1, video input section 33-1, and audio input section 34-1.

7. Successively, the information processing apparatus 1 which is the client AV equipment encrypts the received streams of the original content for transfer to the information processing apparatus 3 which is the server through the network 9.

The information processing apparatus 3 which is the server registers the encrypted streams of content received from the information processing apparatus 1 with a content management table on the external recording section 28-5 or the external recording section 28-6, together with the content ID, information processing apparatus ID, meta information about the content, and the like which are information regarding the content already received.

Figure 14:
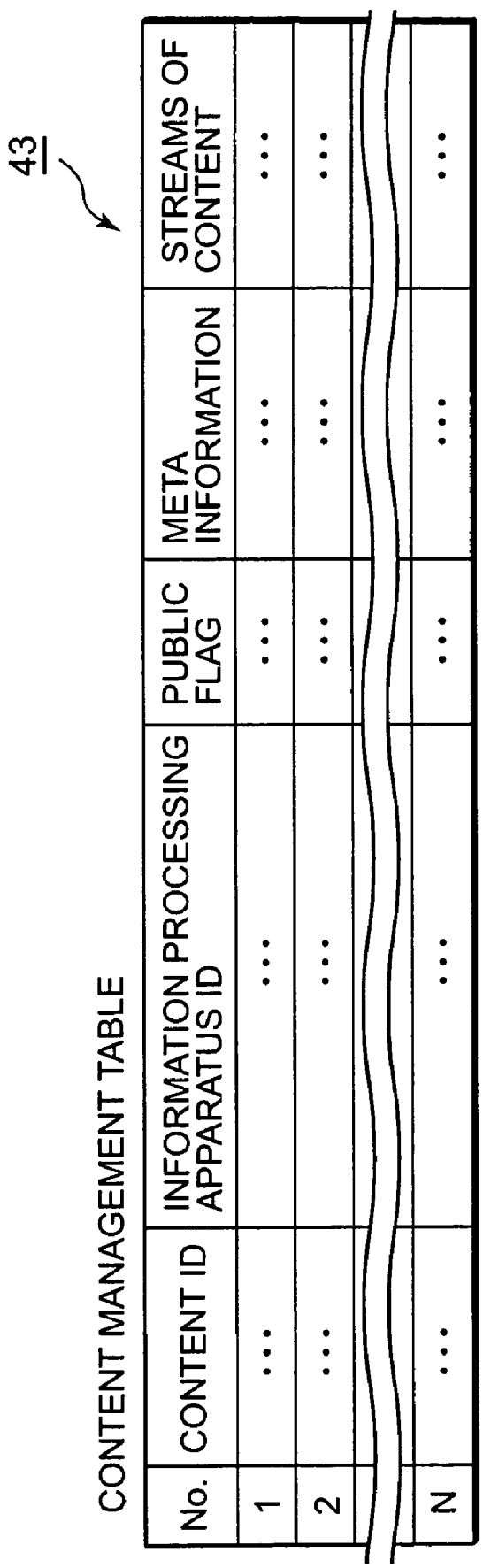
FIG. 14 is a diagram showing a configuration of a content management table 43.

FIG. 14 shows a configuration of a content management table 43. As shown in the figure, an individual one of records of the content management table 43 includes a content ID, an information processing apparatus ID, a "public" flag, meta information about content, streams of content (encrypted streams, original (plain-text) streams). The "public" flag is a flag indicative of whether the status of the content is "public" or "non-public". The "public" flag is set to a value indicative of the "non-public" status when streams of content registered with the content management table 43 are encrypted, and set to a value indicative of the "public" status when they are not encrypted.

The information processing apparatus 1 which is the client AV equipment sends a recording end command to the information processing apparatus 3 when the streams of content for transmission to the information processing apparatus 3 which is the server runs out, and in response to this recording end command, the information processing apparatus 3 ends the stream recording operation.

(Reproduction of Content)

Next, operation performed where content recorded by the home server is to be reproduced by the client AV equipment will be described.

Figure 15:
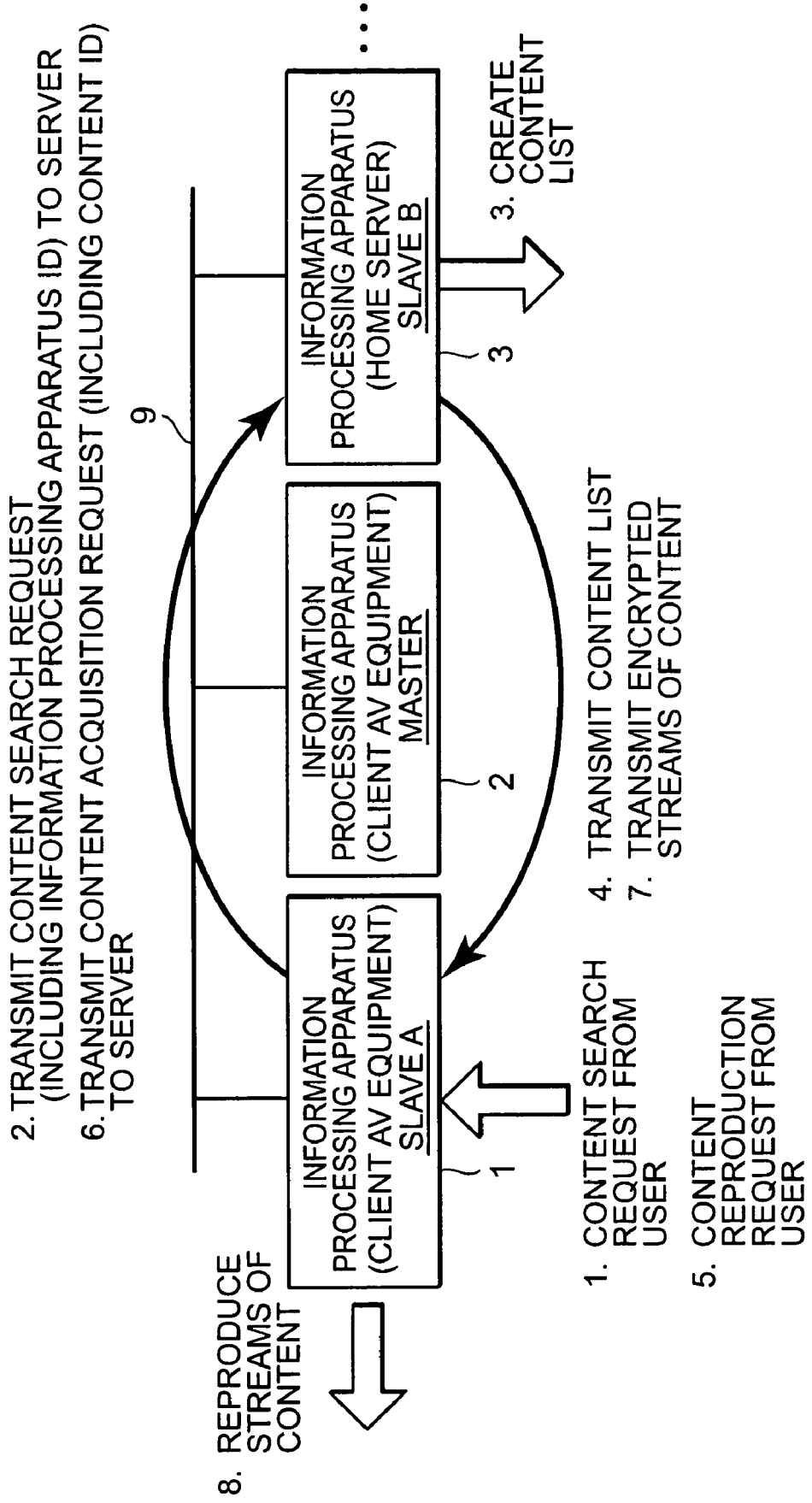
FIG. 15 is a diagram showing operation of reproducing content.

1. As shown in FIG. 15, the user makes a content search request to the information processing apparatus 1 which is the client AV equipment by, e.g., operating the operation panel section 37-1.

2. When receiving the content search request from the user, the information processing apparatus 1 which is the client AV equipment outputs a content search request including the information processing apparatus ID of the self apparatus to the information processing apparatus 3 which is the server.

3. When receiving the content search request, the information processing apparatus 3 which is the server searches records in which the information processing apparatus ID included in the content search request is included, from the content management table 43 shown in FIG. 14 above, and creates a content list which is a list of information regarding the corresponding content.

4. The information processing apparatus 3 which is the server transmits the created content list to the information processing apparatus 1 which is the client AV equipment through the network 9.

5. The information processing apparatus 1 which is the client AV equipment presents the content list received from the information processing apparatus 3 which is the server, to the user through the monitor display apparatus 41, and then waits for a content reproduction request from the user. The user designates the content ID of desired content for reproduction by referring to the content list, thereby making the content reproduction request.

6. The information processing apparatus 1 which is the client AV equipment outputs a content acquisition request including the content ID designated by the user to the information processing apparatus 3 which is the server.

7. When receiving the content acquisition request, the information processing apparatus 3 which is the server searches the corresponding encrypted streams of content from the content management table 43 on the basis of the content ID included in this content acquisition request, for transmission to the information processing apparatus 1 which is the client AV equipment through the network 9.

8. When receiving the encrypted streams of content from the information processing apparatus 3 which is the server, the information processing apparatus 1 which is the client AV equipment decrypts them using a secret key of the self apparatus for reproduction.

(Publication of Content)

Next, operation performed where content recorded on the home server is to be made public by the client AV equipment will be described.

Figure 16:
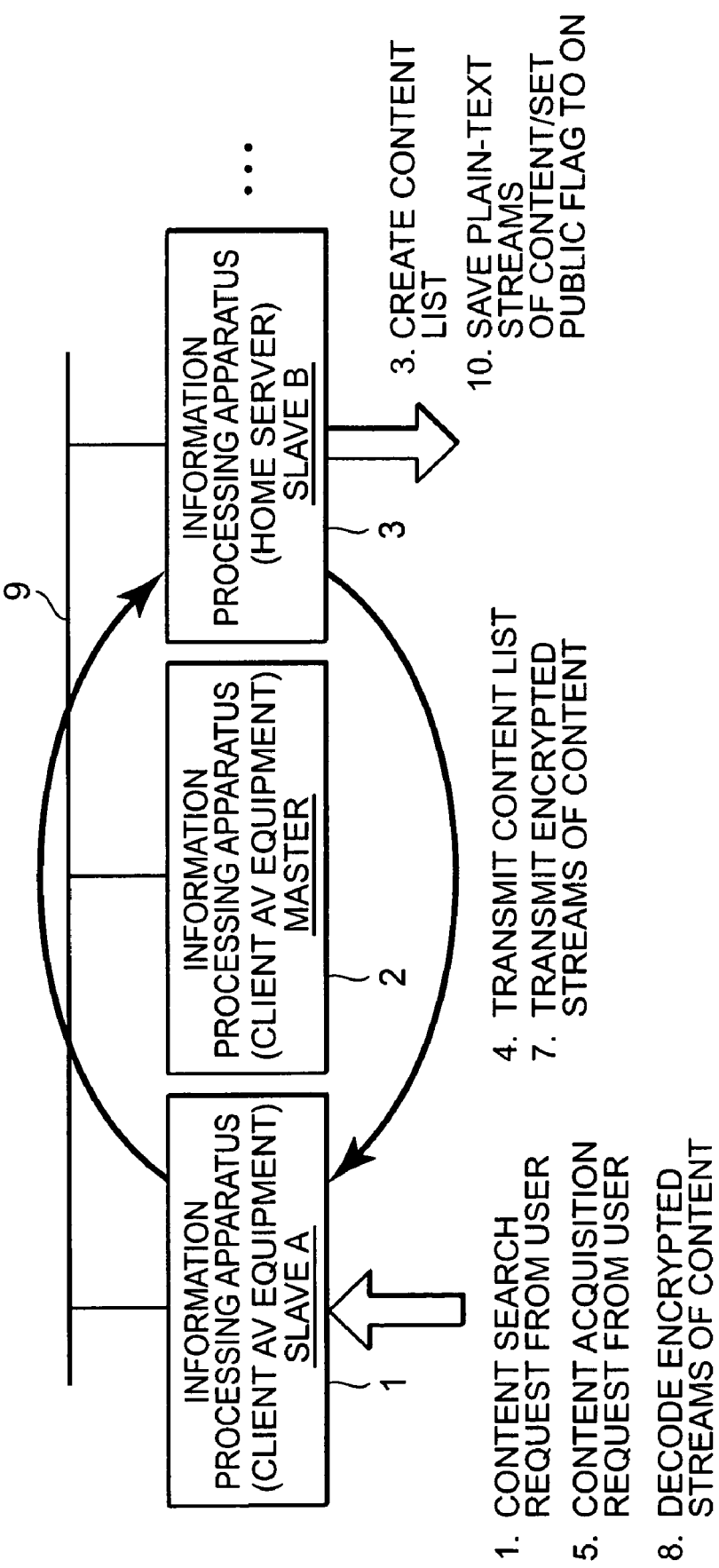
FIG. 16 is a diagram showing operation of publication of content.

1. As shown in FIG. 16, first, the user makes a content search request to the information processing apparatus 1 which is the client AV equipment by, e.g., operating the operation panel section 37-1.

2. When receiving the content search request from the user, the information processing apparatus 1 which is the client AV equipment outputs a content search request including the information processing apparatus ID of the self apparatus to the information processing apparatus 3 (home server) which is the server.

3. When receiving the content search request, the information processing apparatus 3 which is the server searches records in which the information processing apparatus ID included in the content search request is included, from the content management table 43, and creates a content list which is a list of information regarding the corresponding content.

4. The information processing apparatus 3 which is the server transmits the created content list to the information processing apparatus 1 which is the client AV equipment through the network 9.

5. The information processing apparatus 1 which is the client AV equipment presents the content list received from the information processing apparatus 3 which is the server, to the user through the monitor display apparatus 41, and then waits for a publication of content request from the user. The user designates the content ID of content which the user wishes to make public by referring to the content list, and makes a content acquisition request.

6. The information processing apparatus 1 which is the client AV equipment outputs a content acquisition request including the content ID designated by the user to the information processing apparatus 3 which is the server.

7. When receiving the content acquisition request, the information processing apparatus 3 which is the server searches the corresponding encrypted streams of content from the content management table 43 on the basis of the content ID included in this content acquisition request, and transmit this to the information processing apparatus 1 which is the client AV equipment through the network 9.

8. When receiving the encrypted streams of content from the information processing apparatus 3 which is the server, the information processing apparatus 1 which is the client AV equipment decrypts them using a secret key of the self apparatus.

9. Successively, the information processing apparatus 1 which is the client AV equipment transmits the decrypted (plain-text) content to the information processing apparatus 3 which is the server through the network 9.

10. The information processing apparatus 3 which is the server records the plain-text content received from the information processing apparatus 1 which is the client AV equipment into the content management table 43 on the external recording section 28-1 or the external recording section 28-2 as public content, changes the "public" flag in the corresponding record of the content management table 43 from the value indicative of the "non-public" status to the value indicative of the "public" status, and then deletes the original, encrypted streams of content from the content management table 43.

(Reproduction of Public Content)

Next, operation performed where public content recorded on the home server is to be reproduced by the client AV equipment will be described.

1. As shown in FIG. 17, the user makes a public content search request to the information processing apparatus 1 which is the client AV equipment by, e.g., operating the operation panel section 37-1.

2. When receiving the public content search request from the user, the information processing apparatus 1 which is the client AV equipment outputs a public content search request to the information processing apparatus 3 which is the server.

3. When receiving the public content search request, the information processing apparatus 3 which is the server searches records in which the "public" flag is ON from the content management table 43, and creates a public content list which is a list of information regarding the corresponding public content.

4. The information processing apparatus 3 which is the server transmits the created public content list to the information processing apparatus 1 which is the client AV equipment through the network 9.

5. The information processing apparatus 1 which is the client AV equipment presents the public content list received from the information processing apparatus 3 which is the server, to the user through the monitor display apparatus 41, and then waits for a public content reproduction request from the user. The user designates the content ID of desired public content for reproduction by referring to the public content list, and makes a public content acquisition request.

6. The information processing apparatus 1 which is the client AV equipment outputs a public content acquisition request including the content ID designated by the user to the information processing apparatus 3 which is the server.

7. When receiving the public content acquisition request, the information processing apparatus 3 which is the server searches the corresponding public content from the content management table 43 on the basis of the content ID included in this public content acquisition request, and transmits this to the information processing apparatus 1 which is the client AV equipment through the network 9.

8. The information processing apparatus 1 which is the client AV equipment reproduces streams of the public content received.

According to the networked AV system described above, a scheme is implemented in which encrypted streams of content received from the outside using a function of the client AV equipment are transmitted to the home server through the network 9 for recording, and the streams of content recorded on the home server are reproduced by the respective client AV equipment. As a result, the following advantages can be provided.

An information processing apparatus (client AV equipment) that receives/reproduces the streams of content and an information processing apparatus (home server) that records the streams of content are separated from each other, whereby individual information processing apparatus can be additionally installed or replaced in a scalable manner.

By additionally installing information processing apparatus for receiving streams of content, the number of simultaneous recordings to be made can be increased.

The storage capacity of the entire networked AV system can be increased on a centralized basis through replacement of a recording medium such as a hard disk of the home server.

Further, since the client AV equipment encrypts received streams of original content using a secret key of the self apparatus for transfer to the home server, a limitation can be imposed on reproduction of the streams of content by different client AV equipment. Furthermore, since the decrypted streams can be recorded on the home server as public content, it can be configured such that the content on the home server is reproduced by different client AV equipment.

Note that the present invention is not limited to the above-described examples shown in the drawings, but may, of course, be modified in various manners without departing from the scope and spirit of the present invention.

The server on the network 9 is not necessarily limited to a local server such as a home server. It may be, e.g., a global service server provided on the Internet.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A content reproduction apparatus comprising:
an original content reception section for receiving streams of original content;
an encrypted content transmission section for encrypting the streams of original content received by the original content reception section for transmission so as to be recorded on an external content recording apparatus through a network;
an information transmission section for transmitting information about the transmitted content including at least identifying information of a self apparatus so as to be recorded on a recording medium of the content recording apparatus in association with the encrypted streams of content to the content recording apparatus through the network;
a content requesting section for requesting the content recording apparatus to acquire the encrypted streams of content recorded on the recording medium in association with the identifying information of the self apparatus through the network; and
a content reproduction section for receiving the encrypted streams of content transmitted from the content recording apparatus through the network in accordance with the request, and decrypting the encryption for reproduction
an updating section for updating the encrypted streams of content recorded on the recording medium with the streams of public content received from the content reproduction apparatus through the network;
an attribute management section for managing a "public/non-public" attribute of the content recorded on the recording medium, and assigning the "public" attribute to the content updated to the streams of public content by the updating section; and
a public content response section for returning the streams of public content assigned the "public" attribute in accordance with a request for public content from the content reproduction apparatus.

2. The content reproduction apparatus of claim 1, further comprising:
a public content transmission section for decrypting the encrypted streams of content received form the content recording apparatus through the network, and for transmitting the decrypted streams of content to the content recording apparatus through the network so as to be recorded on the recording medium as public content.

3. The content reproduction apparatus of claim 2, further comprising:
a public content request section for requesting the streams of the public content recorded on the recording medium to the content recording apparatus through the network.

4. A content recording apparatus comprising:
an encrypted content reception section for receiving streams of content encrypted by an external content reproduction apparatus through a network;
an information reception section for receiving, from the content reproduction apparatus, information about the received content including at least identifying information of this content reproduction apparatus;
a recording section for recording at least the encrypted streams of content received from the encrypted content reception section and the information about the content received from the information reception section on a recording medium in association with each other; and
a content response section for returning the encrypted streams of content recorded on the recording medium, in association with the identifying information of this content reproduction apparatus, to the content reproduction apparatus in accordance with the request from the content reproduction apparatus
an updating section for updating the encrypted streams of content recorded on the recording medium with the streams of public content received from the content reproduction apparatus through the network;
an attribute management section for managing a "public/non-public" attribute of the content recorded on the recording medium, and assigning the "public" attribute to the content updated to the streams of public content by the updating section; and
a public content response section for returning the streams of public content assigned the "public" attribute in accordance with a request for public content from the content reproduction apparatus.

5. A network system comprising a content reproduction apparatus and a content recording apparatus connected through a network, wherein the content reproduction apparatus comprises:
an original content reception section for receiving streams of original content; an encrypted content transmission section for encrypting the streams of original content received by the original content reception section for transmission so as to be recorded on the content recording apparatus through the network;
an information transmission section for transmitting information about the transmitted content including at least identifying information of a self apparatus so as to be recorded on a recording medium of the content recording apparatus in association with the encrypted streams of content through the network;
a content requesting section for requesting the content recording apparatus to acquire the encrypted streams of content recorded on the recording medium in association with the identifying information of the self apparatus, through the network; and
a content reproduction section for receiving the encrypt6d streams of content transmitted from the content recording apparatus through the network according to the request, and decrypting the encryption for reproduction; and
a public content transmission section for decrypting the encrypted streams of content received form the content recording apparatus through the network, and for transmitting to the content recording apparatus through the network so as to be recorded on the recording medium as public content;
the content recording apparatus comprises:
an encrypted content reception section for receiving the streams of content encrypted by the content reproduction apparatus through the network;
an information reception section for receiving, from the content reproduction apparatus, information about the received content including at least identifying information of this content reproduction apparatus;
a recording section for recording at least the encrypted streams of content received from the encrypted content reception section and the information about the content received from the information reception section on the recording medium in association with each other; and
a content response section for returning the encrypted streams of content recorded on the recording medium in association with the identifying information of this content reproduction apparatus, to the content reproduction apparatus in accordance with the request from the content reproduction apparatus an updating section for updating the encrypted streams of content recorded on the recording medium with the streams of public content received from the content reproduction apparatus through the network;

a public content request section for requesting the streams of the public content recorded on the recording medium to the content recording apparatus through the network, wherein the content recording apparatus further comprises:

an attribute management section for managing a "public/non-public" attribute of the content recorded on the recording medium, and assigning the "public" attribute to the content updated to the streams of public content by the updating section; and a public content response section for returning the streams of public content assigned the "public" attribute in accordance with a request for public content from the content reproduction apparatus.

6. A method for recording and reproducing content utilizing a content reproduction apparatus and a content recording apparatus that are connected through a network, the method comprising:

receiving streams of original content, encrypting these received streams of original content for transmission to the content recording apparatus through the network, and also transmitting information about the transmitted content including at least identifying information of a self apparatus to the content recording apparatus through the network;

recording the encrypted streams of content and the information about the content received from the content reproduction apparatus, on a recording medium in association with each other; and requesting the content recording apparatus to acquire the encrypted streams of content recorded on the recording medium in association with the identifying information of the self apparatus, through the network, receiving the encrypted streams of content transmitted from the content recording apparatus through the network in accordance with this request, and decrypting the encryption for reproduction the content recording apparatus updates the encrypted streams of content recorded on the recording medium with the streams of public content received from the content reproduction apparatus through the network wherein the content recording apparatus assigns a "public" attribute to the content updated to the streams of public content, the content reproduction apparatus requests an acquisition of the streams of public content recorded on the recording medium to the content recording apparatus through the network, and the content recording apparatus returns the streams of original content assigned the "public" attribute in accordance with a request for public content from the content reproduction apparatus.

7. The method of claim 6, wherein the content reproduction apparatus recovers the streams of the original content by decrypting the encrypted streams of content received form the content recording apparatus through the network, and returns the content recording apparatus through the network.

8. The content reproduction apparatus of claim 1, further comprising:

a recording request transmission section for transmitting a recording request command to the content recording apparatus to record the streams of original content received by the original content reception section of the content reproduction apparatus.

9. The content recording apparatus of claim 4, further comprising:

a recording determination section for determining whether recording the streams of content encrypted by the content reproduction apparatus is enabled at the content recording apparatus in response to receiving a recording request command from the content reproduction apparatus.

* * * * *